US012776636B2

(12) United States Patent
Reid et al.

(10) Patent No.: US 12,776,636 B2
(45) Date of Patent: Oct. 27, 2026

(54) CABLE GLAND

(71) Applicant: Hubbell Limited, London (GB)

(72) Inventors: Andrew John Reid, Manchester (GB); Jason Clark, Dukinfield (GB); Lawrence Murray Lonergan, Manchester (GB); Matthew James Ogden, Dukenfield (GB); Carl Jackson, Dukinfield (GB); Gareth Turner, Marple (GB)

(73) Assignee: Hubbell Limited, London (GB)

( * ) Notice: Subject to any disclaimer, the term of this patent is extended or adjusted under 35 U.S.C. 154(b) by 315 days.

(21) Appl. No.: 18/437,751

(22) Filed: Feb. 9, 2024

(65) Prior Publication Data

US 2024/0250515 A1 Jul. 25, 2024

Related U.S. Application Data

(63) Continuation of application No. 17/055,658, filed as application No. PCT/GB2019/051382 on May 17, 2019, now Pat. No. 11,929,598.

(30) Foreign Application Priority Data

May 17, 2018 (GB) ..................................... 1808026

(51) Int. Cl.
*H02G 15/013* (2006.01)
*H02G 3/06* (2006.01)

(52) U.S. Cl.
CPC ......... *H02G 15/013* (2013.01); *H02G 3/0658* (2013.01)

(58) Field of Classification Search
CPC .... H02G 15/013; H02G 3/0658; H02G 1/145; H02G 3/0675; H02G 15/046; H02G 15/007; H02G 15/068
See application file for complete search history.

(56) References Cited

U.S. PATENT DOCUMENTS 3,667,783 A 6/1972 Sotolongo
3,869,155 A 3/1975 Hutchison
(Continued)

FOREIGN PATENT DOCUMENTS

BR PI0805135 A2 * 8/2010
CA 2875463 A1 6/2015
(Continued)

OTHER PUBLICATIONS

Search Report issued on May 23, 2022, by the Intellectual Property Office of the United Kingdom in corresponding UK Patent Application No. GB1907013.5. (2 pages).
(Continued)

*Primary Examiner* — Timothy J. Dole
*Assistant Examiner* — Muhammed Azam
(74) *Attorney, Agent, or Firm* — Robinson + Cole LLP

(57) ABSTRACT

A cable gland sealing member comprising: a sleeve (19) arranged to be slidably received within a passage (9) defined in a body (5) of a cable gland, the sleeve (19) arranged to receive a settable sealing material for forming a seal to a cable passing through the sleeve, wherein the sleeve (19) is defined by an annular side wall extending along an axial length; wherein an outer surface (71) of the sleeve (19) includes a tapered portion (95) such that the external diameter of the sleeve (19) widens in the tapered portion (95); and wherein the outer surface (71) of the sleeve (19) is arranged to form a seal with the cable gland body (5). A cable gland is also disclosed using such a sealing member.

20 Claims, 17 Drawing Sheets

(56) References Cited

U.S. PATENT DOCUMENTS

| | | | | | |
|---|---|---|---|---|---|
| 4,581,480 | A * | 4/1986 | Charlebois | H02G 15/117 174/92 |
| 4,678,866 | A * | 7/1987 | Charlebois | H02G 15/196 156/49 |
| 4,912,815 | A | 4/1990 | Jenkins | |
| 5,310,963 | A | 5/1994 | Kennelly | |
| 5,375,939 | A | 12/1994 | Brown et al. | |
| 5,499,448 | A | 3/1996 | Tournier et al. | |
| 5,510,153 | A | 4/1996 | Lilienthal et al. | |
| 5,621,191 | A * | 4/1997 | Norris | H02G 3/0675 174/653 |
| 5,773,759 | A | 6/1998 | Habluetzel | |
| 6,071,144 | A | 6/2000 | Tang | |
| 6,259,029 | B1 * | 7/2001 | Hand | H02G 15/043 174/74 A |
| 6,268,565 | B1 | 7/2001 | Daoud | |
| 6,274,812 | B1 * | 8/2001 | Daoud | H02G 3/088 16/2.2 |
| 6,812,406 | B2 * | 11/2004 | Hand | H02G 3/0666 174/667 |
| 8,170,390 | B2 * | 5/2012 | Hand | H02G 15/046 385/134 |
| 8,431,836 | B2 * | 4/2013 | Miretti | H02G 3/088 16/2.2 |
| 8,460,031 | B2 | 6/2013 | Paynter et al. | |
| 8,690,599 | B2 | 4/2014 | Bartholomae et al. | |
| 8,872,027 | B2 * | 10/2014 | Proud | H01B 13/323 174/76 |
| 9,178,303 | B2 * | 11/2015 | Franke | H02G 15/115 |
| 9,236,718 | B2 * | 1/2016 | Jung | H02G 3/0675 |
| 9,252,586 | B2 * | 2/2016 | Pratley | H02G 3/088 |
| 9,431,815 | B1 | 8/2016 | Findley | |
| 9,618,227 | B2 | 4/2017 | Drew | |
| 10,090,653 | B2 * | 10/2018 | Gibson | H02G 15/043 |
| 10,389,102 | B2 * | 8/2019 | Jackson | H02G 15/007 |
| 10,594,127 | B2 * | 3/2020 | Portillo Gallego | H02G 15/04 |
| 11,070,042 | B2 * | 7/2021 | Santoro | H02G 3/0675 |
| 11,245,253 | B2 * | 2/2022 | Proud | H02G 15/013 |
| 11,721,958 | B2 * | 8/2023 | Khokle | F16C 17/02 174/650 |
| 11,929,598 | B2 * | 3/2024 | Reid | H02G 3/0675 |
| 12,237,657 | B2 * | 2/2025 | Jackson | H02G 3/0675 |
| 2004/0069522 | A1 * | 4/2004 | Jackson | H02G 3/065 174/669 |
| 2004/0119246 | A1 | 6/2004 | Woller et al. | |
| 2010/0140877 | A1 | 6/2010 | Pratley | |
| 2011/0154940 | A1 * | 6/2011 | Gagne | H02G 15/007 29/527.1 |
| 2011/0226084 | A1 | 9/2011 | Chiou | |
| 2012/0159740 | A1 | 6/2012 | Strelow et al. | |
| 2013/0118803 | A1 | 5/2013 | Magno, Jr. | |
| 2014/0102780 | A1 | 4/2014 | Aldrich et al. | |
| 2014/0202760 | A1 | 7/2014 | Pelletier | |
| 2015/0200530 | A1 | 7/2015 | Chiu | |
| 2015/0200531 | A1 | 7/2015 | Chiu | |
| 2016/0181731 | A1 | 6/2016 | Lehmann et al. | |
| 2017/0125994 | A1 | 5/2017 | Barrett et al. | |
| 2017/0149182 | A1 | 5/2017 | Burris | |
| 2017/0317476 | A1 | 11/2017 | Bertini et al. | |
| 2018/0351341 | A1 | 12/2018 | Hutsler | |
| 2020/0287367 | A1 * | 9/2020 | Gibson | H02G 3/0683 |
| 2021/0234354 | A1 | 7/2021 | Reid et al. | |
| 2022/0320847 | A1 * | 10/2022 | Du | F16J 15/022 |
| 2023/0086292 | A1 * | 3/2023 | Jackson | H01R 13/623 439/320 |

FOREIGN PATENT DOCUMENTS

| | | | | | |
|---|---|---|---|---|---|
| CA | 3035185 | A1 | | 8/2019 | |
| CN | 201188534 | Y | * | 1/2009 | |
| CN | 101512859 | A | | 8/2009 | |
| CN | 105720429 | A | | 6/2016 | |
| CN | 106887771 | A | | 6/2017 | |
| CN | 207358176 | U | | 5/2018 | |
| CN | 112385106 | A | | 2/2021 | |
| DE | 2743140 | C2 | | 6/1978 | |
| DE | 29722267 | U1 | | 2/1998 | |
| DE | 102006062609 | A1 | * | 7/2008 | H02G 3/0675 |
| DE | 20 2008 017 534 | U1 | | 1/2010 | |
| DE | 10 2009 055 641 | A1 | | 5/2011 | |
| DE | 10 2010 027 445 | B3 | | 12/2011 | |
| DE | 102010019600 | B4 | * | 4/2012 | H02G 3/0658 |
| DE | 102017118513 | A1 | * | 2/2019 | H02G 3/0666 |
| EA | 200601825 | A1 | * | 2/2008 | |
| EP | 0 203 269 | A2 | | 12/1986 | |
| EP | 0 307 631 | A1 | | 3/1989 | |
| EP | 0180014 | B1 | * | 4/1991 | H02G 3/0675 |
| EP | 0 618 655 | A1 | | 10/1994 | |
| EP | 0 731 541 | A1 | | 9/1996 | |
| EP | 0 945 947 | A1 | | 3/1999 | |
| EP | 1 760 854 | A1 | | 3/2007 | |
| EP | 2 348 593 | A2 | | 7/2011 | |
| EP | 2 479 857 | A2 | | 7/2012 | |
| EP | 2 690 736 | A2 | | 1/2014 | |
| EP | 2 863 505 | A1 | | 4/2015 | |
| EP | 2 963 749 | A1 | | 1/2016 | |
| FR | 2 480 026 | A1 | | 10/1981 | |
| FR | 2 517 132 | A1 | | 5/1983 | |
| FR | 2 526 597 | A2 | | 11/1983 | |
| FR | 2573930 | A1 | * | 5/1986 | H01R 13/527 |
| FR | 2 803 425 | A1 | | 7/2001 | |
| FR | 2846477 | A1 | * | 4/2004 | H02G 15/04 |
| GB | 1141110 | A | | 1/1969 | |
| GB | 1524684 | A | | 9/1978 | |
| GB | 2074395 | A | * | 10/1981 | H02G 15/04 |
| GB | 2104306 | A | | 3/1983 | |
| GB | 2178909 | A | | 2/1987 | |
| GB | 2213329 | A | | 8/1989 | |
| GB | 2214728 | A | * | 9/1989 | H02G 3/0666 |
| GB | 2219146 | A | * | 11/1989 | H02G 15/04 |
| GB | 2276777 | A | | 10/1994 | |
| GB | 2377829 | A | | 1/2003 | |
| GB | 2509727 | A | | 7/2014 | |
| GB | 2542775 | A | | 4/2017 | |
| GB | 2591817 | A | | 8/2021 | |
| IT | 1086612 | B | | 5/1985 | |
| JP | H0843231 | A | * | 2/1996 | |
| JP | 2014003789 | A | * | 1/2014 | |
| JP | 2014137856 | A | * | 7/2014 | |
| KR | 200405989 | Y1 | * | 1/2006 | H02G 15/013 |
| KR | 200428581 | Y1 | * | 10/2006 | H02G 3/02 |
| KR | 100806705 | B1 | * | 3/2008 | H02G 15/013 |
| KR | 20080001568 | U | * | 6/2008 | H01R 13/622 |
| KR | 100861686 | B1 | * | 10/2008 | H01B 7/282 |
| KR | 20090000608 | U | * | 1/2009 | H02G 3/088 |
| KR | 101065497 | B1 | * | 9/2011 | H02G 3/16 |
| KR | 20120125756 | A | * | 11/2012 | H02G 3/0412 |
| KR | 101304258 | B1 | * | 9/2013 | H01R 4/302 |
| KR | 20130005244 | U | * | 9/2013 | H02G 15/04 |
| KR | 101464918 | B1 | * | 12/2014 | F16B 5/02 |
| KR | 101608174 | B1 | * | 3/2016 | H02G 3/06 |
| KR | 20170002395 | U | * | 7/2017 | H02G 15/013 |
| WO | 93/06637 | A1 | | 4/1993 | |
| WO | 96/18227 | A1 | | 6/1996 | |
| WO | 01/54245 | A1 | | 7/2001 | |
| WO | 02/067400 | A1 | | 8/2002 | |
| WO | 2004/049532 | A1 | | 6/2004 | |
| WO | 2006/068828 | A1 | | 6/2006 | |
| WO | 2008/074965 | A1 | | 6/2008 | |
| WO | 2012/072318 | A1 | | 6/2012 | |
| WO | 2017/051197 | A1 | | 3/2014 | |
| WO | 2017/029232 | A1 | | 2/2017 | |
| WO | 2019/220146 | A1 | | 11/2019 | |
| WO | 2021/094742 | A1 | | 5/2021 | |

OTHER PUBLICATIONS

Office Action issued on May 23, 2022, by the Intellectual Property Office of the United Kingdom in corresponding UK Patent Application No. GB1907013.5. (4 pages).

(56) References Cited

OTHER PUBLICATIONS

Office Action issued on Aug. 26, 2020, by the Intellectual Property Office of the United Kingdom in corresponding UK Patent Application No. GB1907013.5. (2 pages).
Office Action issued on Nov. 19, 2019, by the Intellectual Property Office of the United Kingdom in corresponding UK Patent Application No. GB1907013.5. (4 pages).
The First Office Action issued on Jan. 19, 2022, by the National Intellectual Property Administration of the People's Republic of China in corresponding Chinese Patent Application No. 201980032684.4 and English translation of the Action. (22 pages).
Office Action issued on Sep. 13, 2022, by the Intellectual Property Office of the United Kingdom in corresponding UK Patent Application No. GB1907013.5. (5 pages).
International Search Report and Written Opinion issued on Aug. 27, 2019, by the European Patent Office in corresponding International Patent Application No. PCT/GB2019/051382. (20 pages).

* cited by examiner

CABLE GLAND

RELATED APPLICATION(S)

This application is a continuation of co-pending U.S. National Stage application Ser. No. 17/055,658, filed Nov. 16, 2020, which is a U.S. 371 of PCT Application No. PCT/GB2019/051382, filed May 17, 2019, which claims priority to United Kingdom Patent Application No. 1808026.7 filed May 17, 2018.

FIELD

The present invention relates to cable glands. The present invention also relates to cable gland ingress prevention seals, cable gland sealing members, cable gland clamps and cable gland bodies. The invention has particular, but not exclusive, application to cable glands for sealing around electrical cables. However, the invention also has application to cable glands for sealing around fibre optic cables, pipes and other conduits.

BACKGROUND

Cable glands are commonly used for sealing around a cable or conduit passing through an opening in a wall or bulkhead. For example, cable gland assemblies may be used to seal around a cable entering an enclosure such as a junction box, containing electrical equipment, to prevent fluids entering the enclosure or explosive forces exiting the enclosure. In some instances, cable glands can be used in harsh environments, such as underwater, in high temperatures, or harsh chemical environments.

Typically, a cable gland includes a body, through which the cable passes. The body is formed of a number of parts, that are fixed together to assemble the gland. Each joint can provide a source of leakage. A clamp to grip the cable, and prevent it being pulled out of the gland is provided in the body, along with a number of seals.

In many examples, the clamp also acts as one of the seals, or the seals may requiring tightening of the clamp and/or portions of the body. However, where the clamp fails or loosens, or the body is over or under tightened, this means that the seal also fails or weakens. Furthermore, it is important that the clamp does not damage the cable. Also, under compressive force, cold flow of the cable can occur, where the surface of the cable moves away from the compressive element, further risking loss of clamping force or ingress protection.

Typically one of the seals may be formed by a settable sealing material that is introduced into a sleeve (or pot) through which the cable passes. The sleeve is then received in the body. During assembly, the settable material is allowed to set in the sleeve. The sleeve is then slid out of the body, to allow inspection of the seal formed around the cable, and then slid back in, before the assembly is continued.

It is desired to provide a cable gland that is simple to assemble and inspect, and which can prevent a cable being pulled out, without damaging the cable.

SUMMARY

According to a first aspect of the invention, there is provided a cable gland sealing member comprising: a sleeve arranged to be slidably received within a passage defined in a body of a cable gland, the sleeve arranged to receive a settable sealing material for forming a seal to a cable passing through the sleeve, wherein the sleeve is defined by an annular side wall extending along an axial length; wherein an outer surface of the sleeve includes a tapered portion such that the external diameter of the sleeve widens in the tapered portion; and wherein the outer surface of the sleeve is arranged to form a seal with the cable gland body.

The tapered sleeve ensures it is simple to slide the sleeve out of the body, to inspect the seal between the settable sealing material, during assembly of a cable gland including the sleeve. The tapered shape also helps to form a good seal between the sleeve and the body.

The outer surface may include a cylindrical portion, adjacent the tapered portion. The tapered portion may widen away from the cylindrical portion.

The sleeve may extend from a first end, arranged to be received adjacent an end of the cable gland body, to a second end, opposite the first end, arranged to be received within the passage of the cable gland. The tapered portion may widen towards the second end of the sleeve.

An inner surface of the sleeve may include a tapered portion, tapering in the same direction as the tapered portion of the outer surface. The tapered portion of the outer surface and the tapered portion of the inner surface may taper at different angles and/or over different axial lengths.

The sleeve may be transparent. This allows for easy inspection of the seal formed between the settable sealing material and the cable.

Typically, the sleeve will be formed from a polymeric material, typically an elastic material such as an elastomer.

However, in on embodiment, the sleeve may be formed from metallic material, such as brass. In that case, the tapered portion of the outer surface may narrow towards the second end of the sleeve. Other than the tapered portion, the outer surface may be entirely cylindrical.

According to a second aspect of the invention, there is provided a cable gland comprising: a body having a wall defining a passage extending in an axial direction from a first end to a second end, the passage of the cable gland arranged to receive a cable; adjacent the first end of the cable gland body, a cable gland sealing member according to the first aspect, received within the passage of the cable gland.

The tapered sleeve ensures it is simple to slide the sleeve out of the body, to inspect the seal between the settable sealing material, during assembly of the cable gland. The tapered shape also helps to form a good seal between the sleeve and the body.

The passage of the cable gland may comprise an inner surface. At least part of the inner surface may form a receiving portion arranged to receive the sealing member. The receiving portion may have a taper matching the taper on the outer surface of the sleeve.

The cable gland sealing member may include a rim formed in an exterior surface of the sleeve, at the second end of the sleeve, and wherein the inner surface of the passage of the cable gland comprises a ledge arranged to engage the rim, to prevent withdrawal of the pot in an axial direction. A spacing may be formed between the rim and the ledge, to accommodate deformation or movement of the sleeve under compression.

The sealing member may extend out of the second end of the passage, or may be flush with the second end. However, in an alternative embodiment, the sealing member may not extend as far as the second end such that there is a gap between the sealing member and the second end of the passage. This can ensure that no sealing material is inadvertently deposited on the external portion of the cable gland.

The cable gland may comprise a tightening means to apply compression between the first end of the cable gland body and the second end of the cable gland body. Applying compression between the first and second ends of the cable gland body may compress the sealing member. An outer surface of the sealing member may form a seal with the cable gland body, under compression.

The cable gland may include a spigot received in the passage of the cable gland. The cable gland may also comprise means for fixing the spigot in the passage of the cable gland such that the spigot is arranged to locate the sleeve, and wherein the cable gland sealing member and spigot include correspond hooking projections, arranged to connect the sleeve to the spigot. The spigot may include a seal to prevent escape of the settable sealing material from the sleeve.

Where the sleeve is formed from metallic material, the spigot may be provided with a seat for the tapered portion of the outer surface of the sleeve. Furthermore, there may be provided a gap between the inner surface of the passage of the cable gland and the outer cylindrical surface of the sleeve; this can act as a flame path. The passage of the cable gland may have a step reduction in diameter at the first end to retain the sleeve.

The cable gland may include: a cable passing through the cable gland body and the sealing member; and a set sealing material received in the sleeve, forming a seal between the sleeve and the cable.

The cable gland may include: a cable gland clamp received in the passage of the cable gland, and arranged to grip a cable passing through the passage of the cable gland to prevent axial movement of the cable.

The clamp may comprise an insulating sleeve arranged to receive and grip an insulating outer sheath of a cable. The clamp may further comprise a clamping member arranged around the sleeve. The clamping member may comprise a body formed of insulating material. The clamping member body may have: an inner surface defining a passage extending in an axial direction through the clamping member body, from a first end to a second end, the clamping member passage arranged to receive a cable and exert a gripping force on the insulating outer sheath of the cable, through the insulating sleeve; and an outer surface arranged to engage the cable gland body, to prevent movement of the clamp from the cable gland body in the axial direction. The clamping member body may be formed of a plurality of longitudinal portions, each extending from the first end of the clamping member body to the second end of the clamping member body, and a plurality of hinge portions joining circumferentially adjacent longitudinal portions. The hinge portions may be arranged at alternating ends of the clamping member body, around the circumference, such that the longitudinal portions are joined at alternating ends of the clamping member body.

The clamp can grip onto the insulating covering of a cable passing through the cable gland, and is able to provide an even clamping force along the axial length of the clamp. The clamping force is sufficient to resist the cable being pulled out of the gland in an axial direction. Using an insulating material ensures the cable is properly isolated, electrically. The sleeve could also be used to provide compressive ingress prevention, in some situations.

Each of the longitudinal portions may comprise a gripping surface, having a length extending from the first end of the clamping member body to the second end of the clamping member body, and a width extending around a portion of the circumference of the clamping member body. The gripping surfaces of the longitudinal portions may engage an outer surface of the sleeve.

Adjacent longitudinal portions may be spaced from each other to form a gap extending from the first end of the clamping member body to the second end of the clamping member body, and from the inner surface to the outer surface. The hinge portions may bridge the gap at either the first end of the clamping member body or the second end of the clamping member body.

The cable gland may include: an ingress prevention seal arranged to seal between the cable gland body and a cable passing therethrough. The ingress prevention seal may be separate to the clamp.

The ingress prevention seal may comprise an annular retaining portion arranged to be sealingly secured to an end of a wall of a cable gland body, such that the seal is fitted outside the cable gland body. The ingress prevention seal may also comprise a sealing portion within the annular retaining portion. The ingress prevention seal may further comprise an aperture formed in the sealing portion, the aperture defined by mouth in the sealing portion, arranged to engage and grip a cable passing through the aperture, to form a seal.

The seal is able prevent ingress into a gland with a cable passing through it without requiring tightening of the body of the cable gland, or any other tightening mechanism. As such, the seal is considered non-compressive. By contrast, a compressive seal requires tightening of the gland 1 to compress the seal onto the cable, to form the functioning seal. The use of a non-compressive seal ensures that a cable gland incorporating the seal remains closed against ingress of any external environment, even if the body is over tightened, or comes loose, or the cable moves relative to the seal. The seal also works independently of any clamp that grips the cable, so if the clamp loosens or fails, the seal remains. Furthermore, as the seal is arranged to fit at an end of a cable gland, the seal may be visually inspected.

The ingress prevention seal may include a void or open space m a radial space between the mouth and the retaining portion.

The seal formed by the ingress prevention seal may be formed without compression of the seal in an axial direction of a cable passing through the seal.

The cable gland may include an explosion protection seal received within the cable gland body.

The cable gland body may include a first body part incorporating the first end of the cable gland body; and a second body part, secured to the first body part, and incorporating the second end of the cable gland body. The clamp and explosion protection seal may be received within the passage of the cable gland. The cable gland may further comprise: an armour clamp within the passage of the cable gland, arranged to grip a earthing shield of a cable passing through the gland.

The cable gland has a single external joint, and so the number of possible leakage points, and hence the number of required seals, is reduced. Furthermore, the surface area available on the surface of the gland is increased, providing more area for surface marking, and improving aesthetics.

According to a third aspect of the invention, there is provided a cable gland clamp comprising an insulating sleeve arranged to receive and grip an insulating outer sheath of a cable, and a clamping member arranged around the sleeve, the clamping member comprising a body formed of insulating material, the body having: an inner surface defining a passage extending in an axial direction through the body, from a first end to a second end, the passage arranged to receive a cable and exert a gripping force on the an insulating outer sheath of the cable, through the insulating sleeve; and an outer surface arranged to engage a cable gland body, to prevent movement of the clamp from the body in the axial direction, wherein the body is formed of a plurality of longitudinal portions, each extending from the first end to the second end, and a plurality of hinge portions joining circumferentially adjacent longitudinal portions; and wherein the hinge portions are arranged at alternating ends of the body, around the circumference, such that the longitudinal portions are joined at alternating ends of the body.

The clamp can grip onto the insulating covering of a cable passing through the cable gland, and is able to provide an even clamping force along the axial length of the clamp, preventing damage to the cable. The clamping force is sufficient to resist a cable being pulled out in an axial direction. Using an insulating material ensures the cable is properly isolated, electrically.

Each of the longitudinal portions may comprise a gripping surface, having a length extending from the first end of the body to the second end, and a width extending around a portion of the circumference of the body. The gripping surfaces of the longitudinal portions may engage an outer surface of the sleeve.

Adjacent longitudinal portions may be spaced from each other to form a gap extending from the first end to the second end, and from the inner surface to the outer surface. The hinge portions may bridge the gap at either the first end or the second end.

The longitudinal portions may be arranged such that a width of each gap, around the circumference of the body, widens away from the respective hinge portion bridging the gap at either the first end or the second end.

Each gripping surface may include a pair of parallel spaced edges, extending form the first end to the second end. Each edge may extend around a portion of the circumference of the passage.

The hinge portions may be formed by live hinges.

The body may be formed of a single unitary piece.

The outer surface may comprise a tapered portion at the first end and/or second end. The tapered portion may extend around the circumference of the body, and may taper radially inwards towards the respective end.

The clamp may be formed of thermoplastics or silicone rubber.

According to a fourth aspect, there is provided a cable gland comprising: a body defining a passage extending in an axial direction, the passage arranged to receive a cable; a first projection extending radially into the passage; a second projection extending radially into the passage, axially spaced from the first extension; and between the first projection and the second projection, a cable gland clamp according to the first aspect.

The clamp can grip onto the insulating covering of a cable passing through the cable gland, and is able to provide an even clamping force along the axial length of the clamp. The clamping force is sufficient to resist the cable being pulled out of the gland in an axial direction. Using an insulating material ensures the cable is properly isolated, electrically. The sleeve could also be used to provide compressive ingress prevention, in some situations.

The cable gland may further comprise an ingress prevention seal arranged to seal between the body a cable passing therethrough, at an opening of the passage.

Using a separate seal and clamp, ensures the action of the seal is independent of the clamp. Therefore, if the clamp is loose, at least some level of seal remains intact, and the effect of cold flow is reduced or eliminated.

The cable gland may further comprise a sealing member arranged to seal between the body, and a cable passing through the sealing member. The sealing member may comprise a receptacle slidably received in the passage. The receptacle may be arranged to receive a settable sealing material. In use, a cable may pass through the receptacle such that the settable sealing material forms a seal between the receptacle and the cable, and receptacle forms a seal to the body.

According to a fifth aspect of the invention, there is provided a cable gland ingress prevention seal comprising: an annular retaining portion arranged to be sealingly secured to an end of a wall of a cable gland body, such that the seal is fitted outside the cable gland body; a sealing portion within the annular retaining portion; and an aperture formed in the sealing portion, the aperture defined by mouth in the sealing portion, arranged to engage and grip a cable passing through the aperture, to form a seal.

The seal is able prevent ingress into a gland with a cable passing through it without requiring tightening of the body of the cable gland, or any other tightening mechanism. As such, the seal is considered non-compressive. By contrast, a compressive seal requires tightening of the gland 1 to compress the seal onto the cable, to form the functioning seal. This ensures that a cable gland incorporating the seal remains closed against ingress of any external environment, even if the body is over tightened, or comes loose, or the cable moves relative to the seal. The seal also works independently of the clamp, so if the clamp loosens or fails, the seal remains. Furthermore, as the seal is arranged to fit at an end of a cable gland, the seal may be visually inspected.

The seal may be formed of a single unitary part.

The seal may be formed of silicone rubber, or any other rubberised materials, such as thermoplastic elastomers (TPEs), Neoprene, ethylene propylene diene monomer rubber (EPDM) and the like.

The retaining portion may comprise one or more projections, arranged to engage corresponding projections in the body of the cable gland.

The mouth may include a void or open space in a radial space between the mouth and the retaining portion. The void accommodates any compression of the seal, rather than the compression being passed on to the cable.

The mouth may be axially spaced from the retaining portion, such that the sealing portion forms a truncated cone. The cable gland ingress prevention seal may comprise a lip formed at the mouth. The cable gland may be deformable such that the mouth can move axially with respect to the retaining portion. In a first configuration the mouth may be arranged on a first axial side of the retaining portion, and in a second configuration, the mouth may be arranged on a second axial side of the retaining portion, opposite the first.

The mouth may be formed of an annular wall having a length extending along the axis. The retaining portion may extend axially, and the mouth and retaining portion may be at least partially concentric.

The cable gland ingress prevention seal may comprise one or more ribs extending in an arc from the retaining portion to the mouth. Alternatively, the sealing portion may comprise a pair of annular, axially spaced sidewalls, extending from the retaining portion to the mouth, the sidewalls, retaining portion and mouth enclosing an annular void. The enclosed void, or the space between the ribs provide examples of the way to accommodate compression.

The seal may be formed without compression of the ingress prevention seal in an axial direction of a cable passing through the seal.

According to a sixth aspect of the invention, there is provided a cable gland comprising: a body having a wall defining a passage extending in an axial direction, the passage arranged to receive a cable; and at a first end of the wall, a cable gland ingress prevention seal according to the third aspect.

The seal is able prevent ingress into a gland with a cable passing through it without requiring tightening of the body of the cable gland, or any other tightening mechanism. As such, the seal is considered non-compressive. By contrast, a compressive seal requires tightening of the gland 1 to compress the seal onto the cable, to form the functioning seal. The use of a non-compressive seal ensures that a cable gland incorporating the seal remains closed against ingress of any external environment, even if the body is over tightened, or comes loose, or the cable moves relative to the seal. The seal also works independently of any clamp that grips the cable, so if the clamp loosens or fails, the seal remains. Furthermore, as the seal is arranged to fit at an end of a cable gland, the seal may be visually inspected.

The cable gland may further comprise: a cable gland clamp received in the passage, and arranged to grip a cable passing through the passage to prevent axial movement of the cable. The clamp may comprise a clamp according to the first aspect. The use of a separate clamp and seal ensures that the action of the clamp and seal are separated. Therefore, for example, if the clamp fails or loosens, the seal is still maintained, to prevent ingress into the gland. As discussed above, the clamp may or may not provide further ingress prevention.

The cable gland may further comprise a sealing member arranged to seal between the body, and a cable passing through the sealing member. The sealing member may comprise a receptacle slidably received in the passage. The receptacle may be arranged to receive a settable sealing material. In use, a cable may pass through the receptacle such that the settable sealing material forms a seal between the receptacle and the cable, and receptacle forms a seal to the body.

The cable gland may include an explosion protection seal received within the body of the cable gland.

According to a seventh aspect of the invention, there is provided a cable gland comprising: a body defining a passage extending in an axial direction from a first end to a second end, the body including: a first body part incorporating the first end; and a second body part, secured to the first body part, and incorporating the second end; a clamping member within the passage, arranged to grip a cable passing through the passage, to prevent axial movement of the cable, in use; a receptacle within the passage, arranged to receive a settable sealing material to form a sealing member around a cable passing through the passage; an armour clamp within the passage, arranged to grip a earthing shield of a cable passing through the gland; and an explosion protection seal within the passage.

The cable gland has a single external joint, and so the number of possible leakage points, and hence the number of required seals, is reduced. Furthermore, the surface area available on the surface of the gland is increased, providing more area for surface marking, and improving aesthetics.

The first and second body parts may be secured together by a first set of inter-engaging screw threads. Tightening the screw threads may apply compression between the first end and the second end. The cable gland may include a retaining nut arranged to retain the receptacle in an axial position, the retaining nut received within the passage formed by the first and second body parts. The retaining nut may be secured to the body by a second set of inter-engaging screw threads. An internal part of one of the first or second body portions may be received within the other of the first or second body portions. The internal part may have: a first region and a second region. The first region may have a first external diameter corresponding to an internal diameter of the other of the first or second body portions. The first region may include a screw thread on an external surface, arranged to engage with a corresponding thread formed on the inner surface of the other of the first or second body portion. The second region may have a second diameter smaller than the first. The first region may be axially between the first end and the second region. The second region may include a screw thread on the external surface, arranged to engage with a corresponding thread formed on an inner surface of the retaining nut.

The cable gland may include an annular retaining member, arranged to engage the receptacle. The retaining nut may be arranged to retain the annular retaining member within the through passage.

The retaining nut may comprise a first axial surface arranged to retain the receptacle, and a second axial surface opposing the first, arranged to engage the clamping member.

The clamping member may comprise a cable gland clamp according to the first aspect.

The cable gland may include an ingress prevention seal, separate to the clamping member. The ingress prevention seal may comprise a cable gland ingress prevention seal according to the third aspect.

The sealing member may comprise a cable gland sealing member according to the fifth aspect.

According to an eighth aspect of the invention, there is provided a cable gland comprising a metallic body having a wall defining a passage having internal walls, the passage arranged to receive a cable; and an earthing clip formed of wire within the passage, the earthing clip engaging the internal walls and extending inwards.

As such, this provides for a simple and convenient earthing clip. Typically, the earthing clip would be positioned so as to contact an earthing sheath of a cable in the passage muse.

Typically, the earthing clip may be received within a recess within the internal walls. This can help to locate the earthing clip.

The earthing clip may comprise a base loop defining a planar circular arc, and at least one prong formed of portions of wire bent away from the base loop to as to extend inwards into the passage. There may be at least two or three prongs.

The earthing clip be formed of a single length of wire, having two ends. The length of wire may be provided with a return bend adjacent to each end arranged so that, in use, the return bends and not the ends contact the earthing sheath.

The cable gland may be m accordance with the second, fourth, sixth or seventh aspects of the invention.

In accordance with a ninth aspect of the invention, we provide a cable gland comprising a body having a wall defining a passage having internal walls, the passage arranged to receive a cable; a clamp arranged to clamp the cable circumferentially and a clamp driving nut arranged to drive the clamp into engagement with the clamp, with the clamp driving nut being threadedly mounted on the body such that rotation of the clamp driving nut changes an internal diameter of the clamp, in which the body has formed on it a scale showing the linear displacement of the clamp driving nut relative to the body, so as to give an indication of the internal diameter of the clamp.

As such, the linear travel of the clamp driving nut can be used to show the internal diameter of the clamp. As such, a user can gauge if they have appropriately tightened the clamp driving nut by looking at the position of the clamp driving nut relative to the scale.

Typically, the clamp driving nut may comprise a back nut of the cable gland, and may form the second body part of any of the second, fourth, sixth or seventh aspects of the invention.

It will be appreciated that optional features discussed in relation to a particular aspect or embodiment may also be applied to any other aspect or embodiment.

There now follows, by way of example only, a description of embodiments of the invention, described with reference to the accompanying drawings, and in which:

DETAILED DESCRIPTION

In the description of the embodiments that follows, the construction and/or arrangement and/or function and/or operation is only described insofar as necessary for an understanding of each embodiment and therefore the description of features that are the same or similar in different embodiments may not be repeated as these will be understood from their description in other embodiments. Accordingly, the embodiments are not to be read and interpreted in isolation and any feature described in a particular embodiment will be understood to have application to other embodiments unless specifically excluded by the description.

Figure 1A:
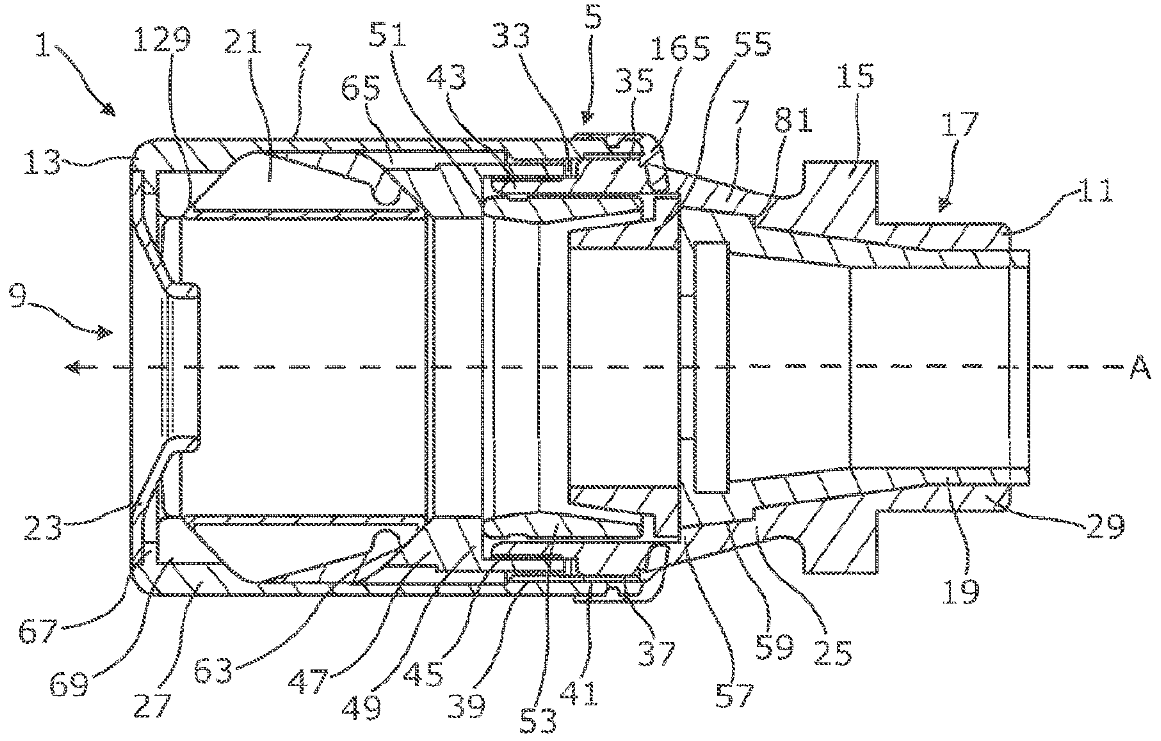
FIG. 1A is a schematic sectional view of a cable gland, according to an embodiment of the invention.
Figure 1C:
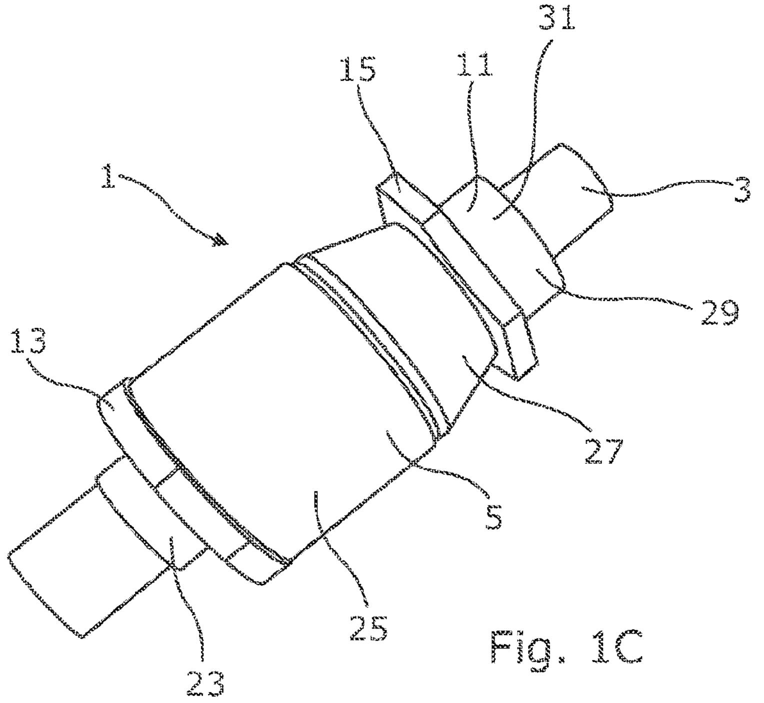
FIG. 1C is a perspective view of the cable gland of FIG. 1A, assembled with a cable.
Figure 1B:
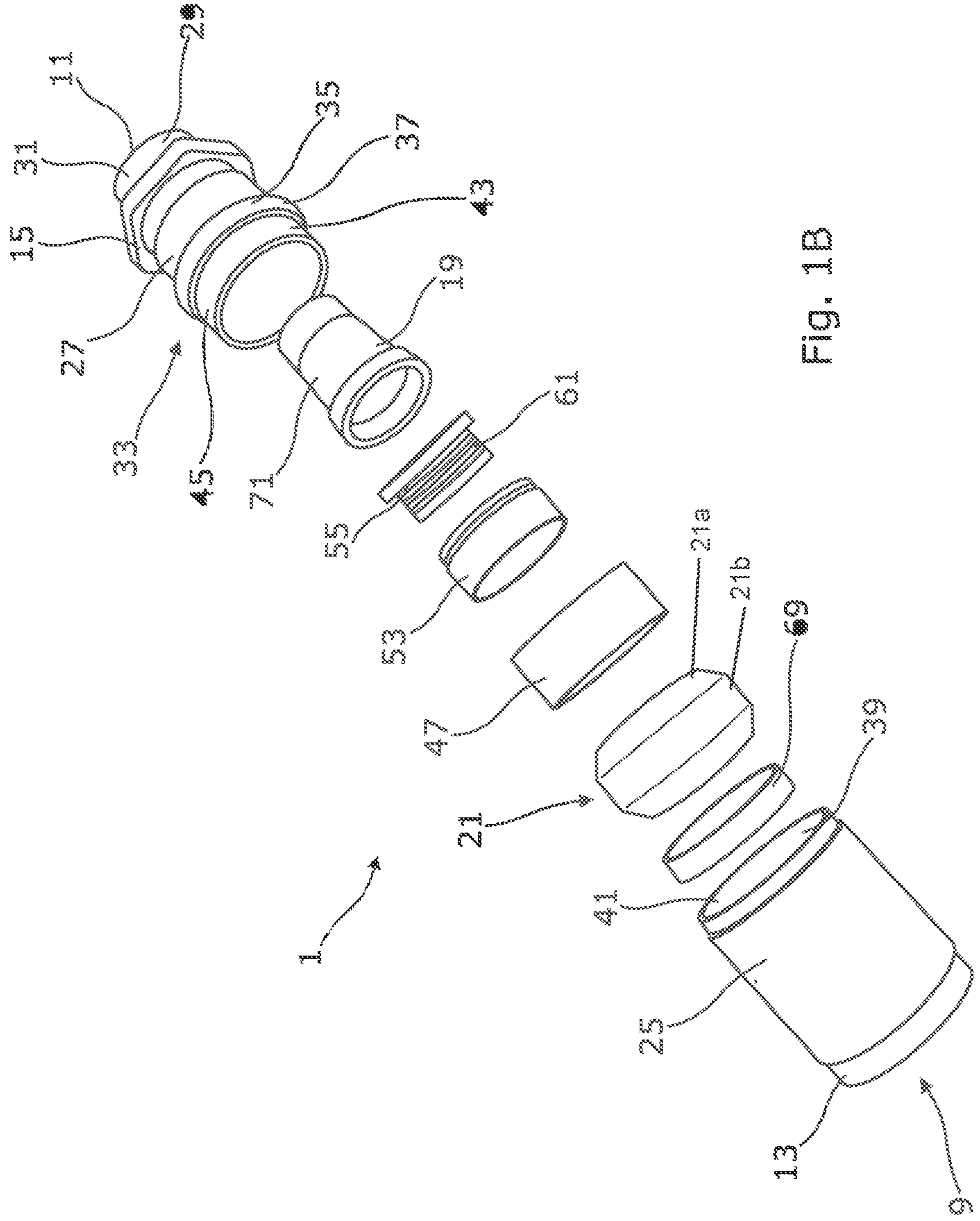
FIG. 1B is a perspective exploded view of the cable gland of FIG. 1A.

FIGS. 1A to 1C illustrate an example of a cable gland 1 according to an embodiment of the invention. FIG. 1A illustrates the cable gland 1 in assembled form, without a cable, in sectional side view, and FIG. 1B illustrates the cable gland 1 in exploded view. FIG. 1C illustrates the cable gland 1, in assembled form, with a cable 3 passing through it. The cable 3 typically includes a number of conducting cores (not shown), each having its own insulating jacket (not shown). The cores are surrounded by an inner sheath (not shown). This, in turn, is surrounded by an insulating outer sheath (not shown). An earthing shield, such a braid or armour, is provided between the inner and outer sheath.

The cable gland 1 includes a body 5 formed by an annular wall 7. The wall 7 defines a passage 9 extending through the body 5 in an axial direction A. The passage 9 extends from a first end 11 of the body 5 to a second end 13. Adjacent the first end 11, an external flange 15 is formed on the body for mounting the cable gland 1 to a wall, bulkhead or housing (not shown) through which the cable 3 is passing. In use, the first end 11 of the cable gland 1 is provided through an opening in the bulkhead, and the second end 13 is in an external environment.

Within the passage 9, near the first end 11, a sleeve-like sealing member 17 is formed in a compound pot 19. Also within the passage 9 is a clamp 21 for gripping on to the external insulation cover of the cable 3. The clamp 21 is provided between the compound pot 19, and the second end 13. At the second end 13, an ingress prevention seal 23 is provided over the opening of the passage 9. Further explosion protection seals 10 may also be received in the passage 9, and an external rubber seal is provided on the outside of the body 5. The compound pot 19, clamp 21 and ingress prevention seal 23 will be discussed in further detail below.

The body 5 is formed of a first part 25 and a second part 27. Each of the parts 25, 27 forms an axial portion of the body 5, such that each of the parts 25, 27 extends around the circumference of the passage 9, and along a portion of the length.

The first body part 25, also referred to as the entry, incorporates the first end 11 and the external flange 15, and receives the compound pot 19. Between the first end 11 and the external flange 15, the first body part 25 includes a cylindrical portion 29. This may include a screw thread or the like 31 for receiving a nut to secure the gland to the bulkhead through which the cable passes.

Figure 2:
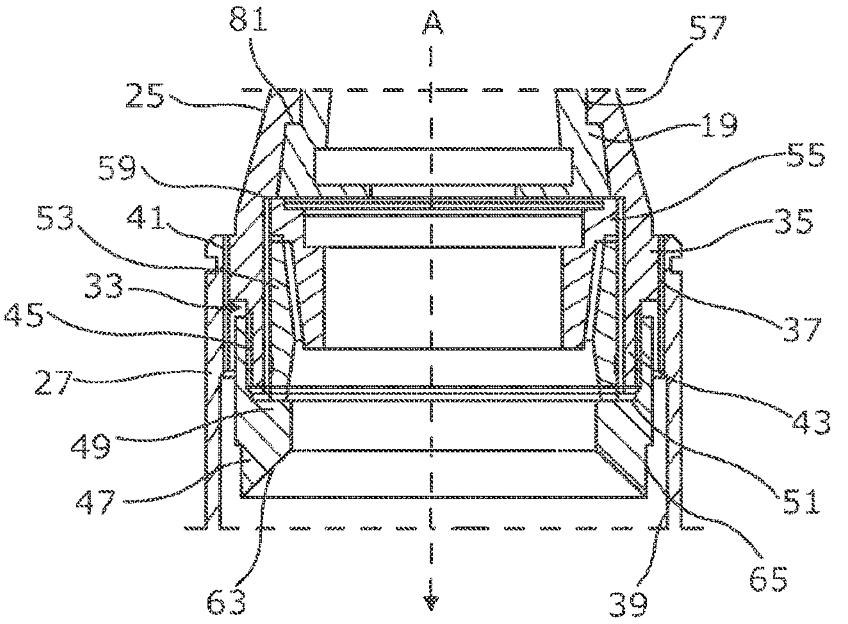
FIG. 2 shows the region of the cable gland of FIG. 1A where the first and second body portions join, in sectional view.

The first body part 25 tapers outward, away from the first end 11, after the flange 15. A further cylindrical section 33 is provided opposite the first end 11 of the body 5. In the assembled gland 1, the further cylindrical section 33 is received within the second body part 27. FIG. 2 illustrates the region where the first body part 25 extends into the second 27.

A first region 35 of the further cylindrical section 33, adjacent the taper, includes a first screw thread 37. The width of the first region 35 is such that the first screw thread 37 engages with a corresponding screw thread 41 on the inner surface 39 of the second portion 27, to join the body parts 25, 27 together. Tightening the screw thread applies compression between the first end 11 and the second end 13.

A second region 43 of the further cylindrical section 33, at the end of the first body part 25 opposite the first end 11, is of narrower diameter than the first region 35. The second region 43 includes an external screw thread 45 to secure a spigot retaining nut 47 to the end of the first body part 25. The spigot retaining nut 47 extends axially, to continue the second region 43 of the further cylindrical section 33.

On a first axial face 49 of the spigot retaining nut 47, at which the spigot retaining nut 47 joins the first body portion 25, a radially extending ledge 51 is formed, extending into the passage 9. The ledge 51 forms a seat for an armour clamp 53 arranged to grip the earth shielding of the cable, and electrically couple the earth shielding to the body 5 of the gland 1.

A spigot (or annular retaining member) 55 is located between a ledge 57 formed in the inner surface 59 of the first body part 25, and the end of the armour clamp 53. The spigot 55 includes grooves 61 formed on the tapered surface extending inside the armour clamp 53, and an annular rim 63 which engages the ledge 57 in the first body part 25, and extends radially inward to form a seat for the compound pot 19. The spigot 55 is retained in place by the ledge 57 on one face, and the armour clamp 53 and retaining nut 47 on the other face.

The second axial face 65 of the spigot retaining nut 47 forms a seat for the clamp 21, as will be discussed in more detail below. The cable 3 is passed through the spigot retaining nut 47, armour clamp 53 and spigot 55. The earthing shield (not shown) is gripped by the armour clamp, in co-operation with the grooves 61 on the surface of the spigot 55.

The second body part 27 forms a back nut of the cable gland 1. The clamp 21 is received within the part of the passage 9 formed by the back nut 27. The second body part 27 includes an annular ledge 67 extending across the second end 13. An annular ring 69 is provided within the passage 9, resting on the ledge 67, and provides a second seat for the clamp 21, such that the clamp 21 is received between the ring 69 and the spigot retaining nut 47.

Figure 3A:
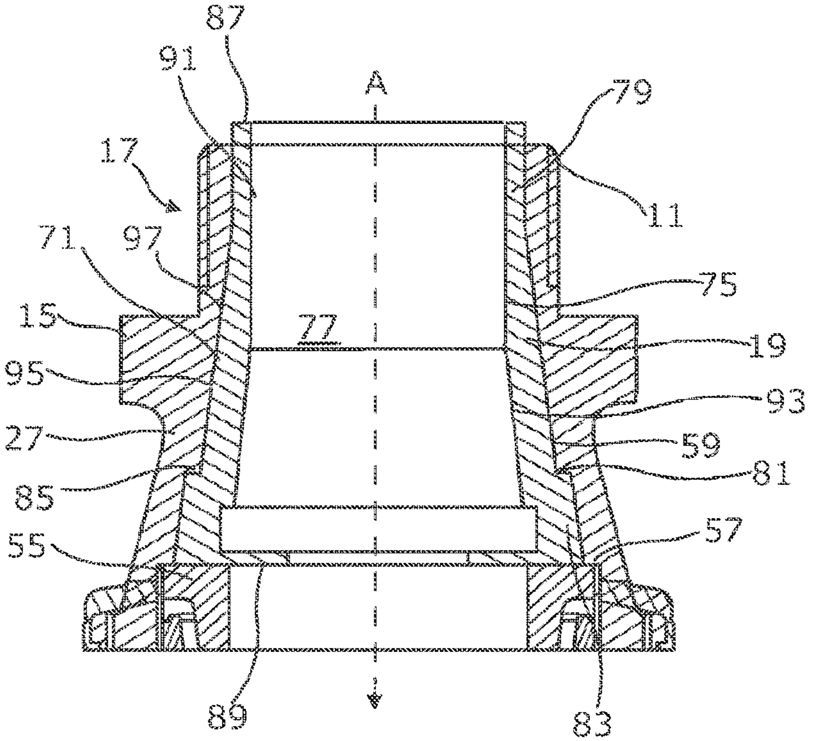
FIG. 3A shows the region of the compound pot of the cable gland of FIG. 1A, in sectional view.

FIG. 3A illustrates the region of the compound pot 19, in more detail.

The compound pot 19 is formed of a transparent polymer cylindrical wall 79, extending from a first end 87 to a second end 89. The first end 87 of the wall 79 is received at the first end of the gland 11, and the second end 89 of the wall is within the passage 9.

The wall 79 has an outer surface 71, that engages with an inner surface 59 of the first body portion 25, and an inner surface 75 that forms a through passage 77, through which the cable 3 extends, in the assembled gland 1.

The outer surface 71 includes a ledge 81 formed in a rim 83 at the second end 89, which engages with a step 85 formed in the inner surface 75 of the first body member 25, to retain against the pot 19 being pulled out in a direction towards the first end 11. An spacing is formed between the ledge 81 and the step 85, along the axial direction A, and, optionally also in a radial direction. The outer surface 71 is tapered inwards from the rim 83 to the first end 87, to form a tapered region 95. The inner surface 75 of the first body portion 25 includes a matching tapered portion 97.

The inner surface 75 of the cylindrical wall 79 includes a cylindrical portion 91 adjacent the first end 87, with a tapered portion 93 tapering inwards form the second end 89 to the cylindrical portion 91.

In use, the pot 19 is provided in the first body part 25, and the cable is passed through component parts of the gland 1, without screwing the body portions 25, 27 together. A settable sealing material (not shown) is injected into the pot 19, and allowed to set to form a plug (not shown). The pot 19 and first body part 25 are then slid apart (the pot 19 moving toward the second body part 27, and/or the first body part 25 moving away from the second body part 27), to allow visual inspection to ensure that no voids are formed in the pot 19, and so the pot is properly filled and the plug is properly formed around the cable 5. The pot 19 is then slid back into the first body part 25.

When the first and second body part 25, 27 are screwed together, the pot 19 and plug are compressed. Even under compression, at the ledge 81 in the compound pot 19 is spaced from the step 85 in the inner surface 75 of the first body member 25, to ensure that the tapered regions 95, 97 engage, rather than the ledge 81 and step 85. Therefore, a seal is formed between the pot 19, and the inner surface 59 of the first body member 25, along the length of the tapered region 95, 97. As such, the pot 19 and plug for the sealing member 17.

Figure 3B:
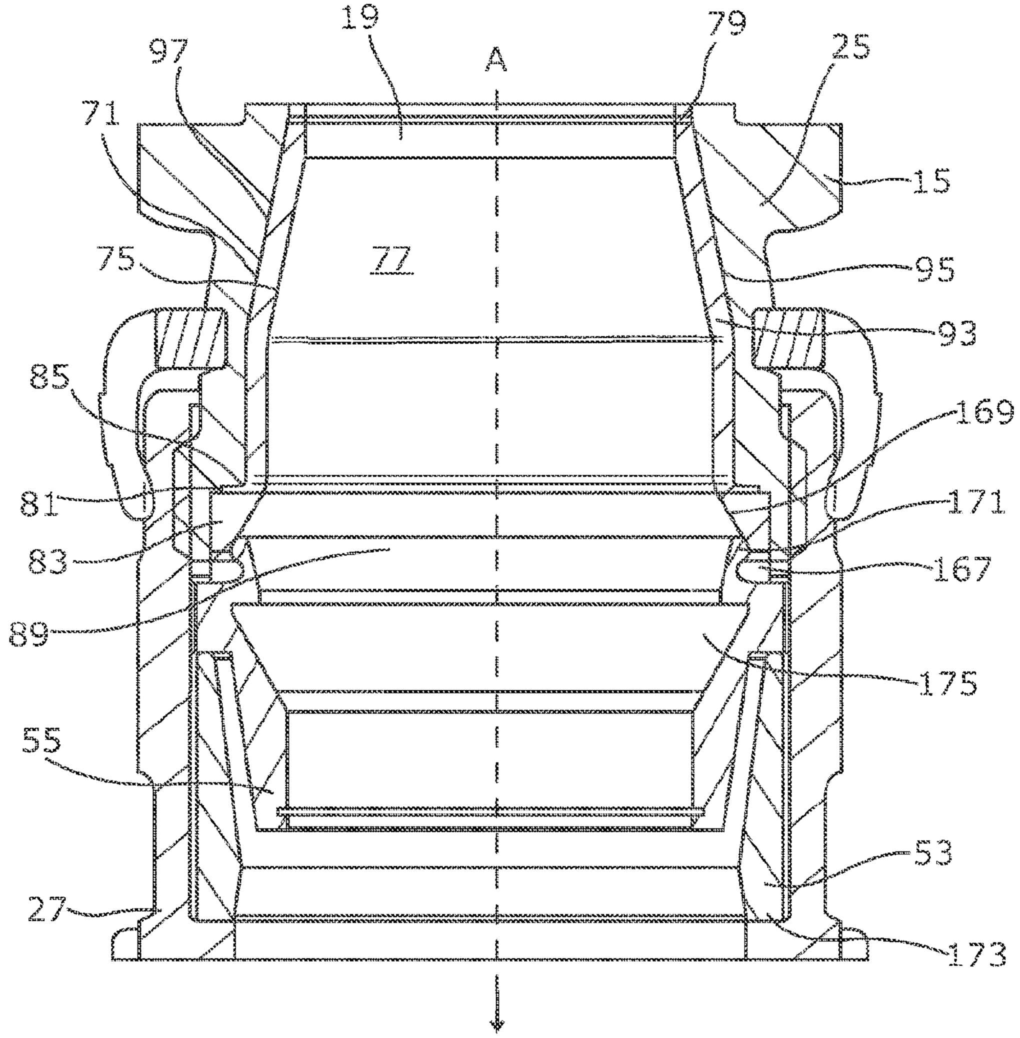
FIG. 3B shows an alternative arrangement of the compound pot of the cable gland of FIG. 1A.

FIG. 3B illustrates an alternative arrangement for the second end 89 of the compound pot 19, which may be used instead of the arrangement shown in FIG. 3A. The compound pot 19 shown in FIG. 3B is the same as the compound pot discussed above, unless explicitly stated otherwise.

In the example shown in FIG. 3B, an annular hooking projection 167 is formed in the inner surface 169 of the rim 83. The hooking projection 167 is formed at the second end 89 of the compound pot 19, from where the inner surface of the rim 83 tapers into the passage. A corresponding hooking projection 171 is formed in the spigot 55, such that, in use, the spigot 55 may clip to the compound pot, to further locate the spigot 55.

In this example, the spigot retaining nut 47 may optionally be omitted. In this case, the armour clamp 53 is secured between the spigot 55 and a ledge 173 formed in the inner surface of the second body portion 27. However, in other examples, the spigot retaining nut may be retained.

Furthermore, in the example shown in FIG. 3B, the spigot 55 includes a settable compound seal 175 arranged inside the spigot 55. In use, the settable compound seal 175 forms a seal to the cable passing through the spigot 55, and prevents escape of the settable sealing material outside the pot 19, as it is being poured in.

The settable compound seal 175 is formed of a softer, less rigid material than the pot 19. When the plug is formed, the plug provides a high quality seal for general use. However, the softer settable compound seal 175 ensures a sufficient seal is formed during introduction of the settable sealing material.

The settable compound seal 175 is provided away from the end of the spigot 55, such that the settable sealing material extends partially into the spigot 55, and forms an interface with the material of the spigot 55. Therefore, once the plug is formed, pressure applied to the plug that may urge the compound pot 19 away from the taper is applied directly against the spigot 55, such that the compound pot 19 is held in place.

It will be appreciated that the seal 175 and/or the interengaging hooking portions 167, 171 may be applied to the compound pot 19 shown in FIG. 3A. Where the hooking portions are 167, 171 the spigot retaining nut 47 may optionally be omitted.

Figure 7:
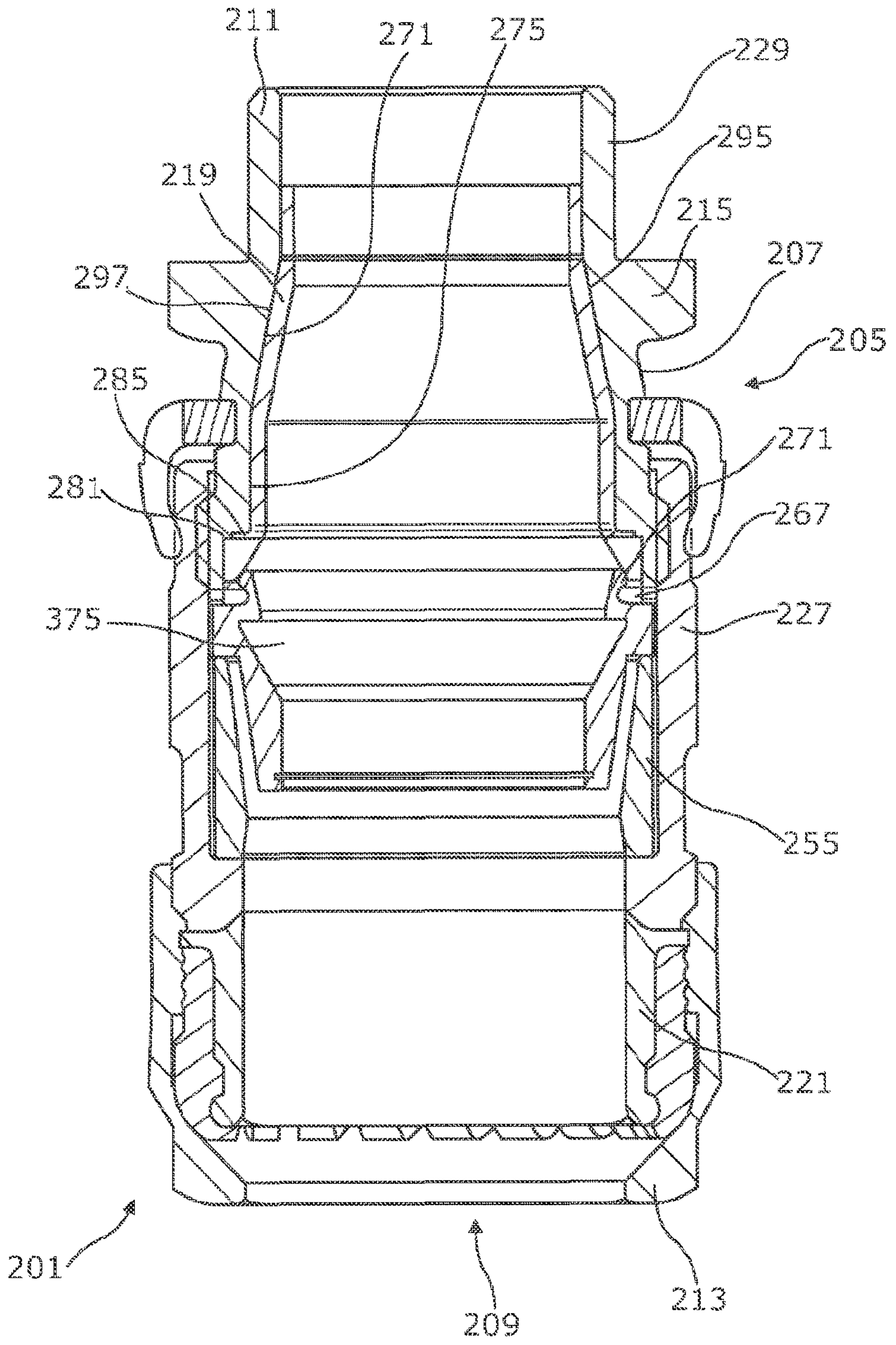
FIG. 7 shows a cross-section through a cable gland of an alternative embodiment of the invention.
Figure 8:
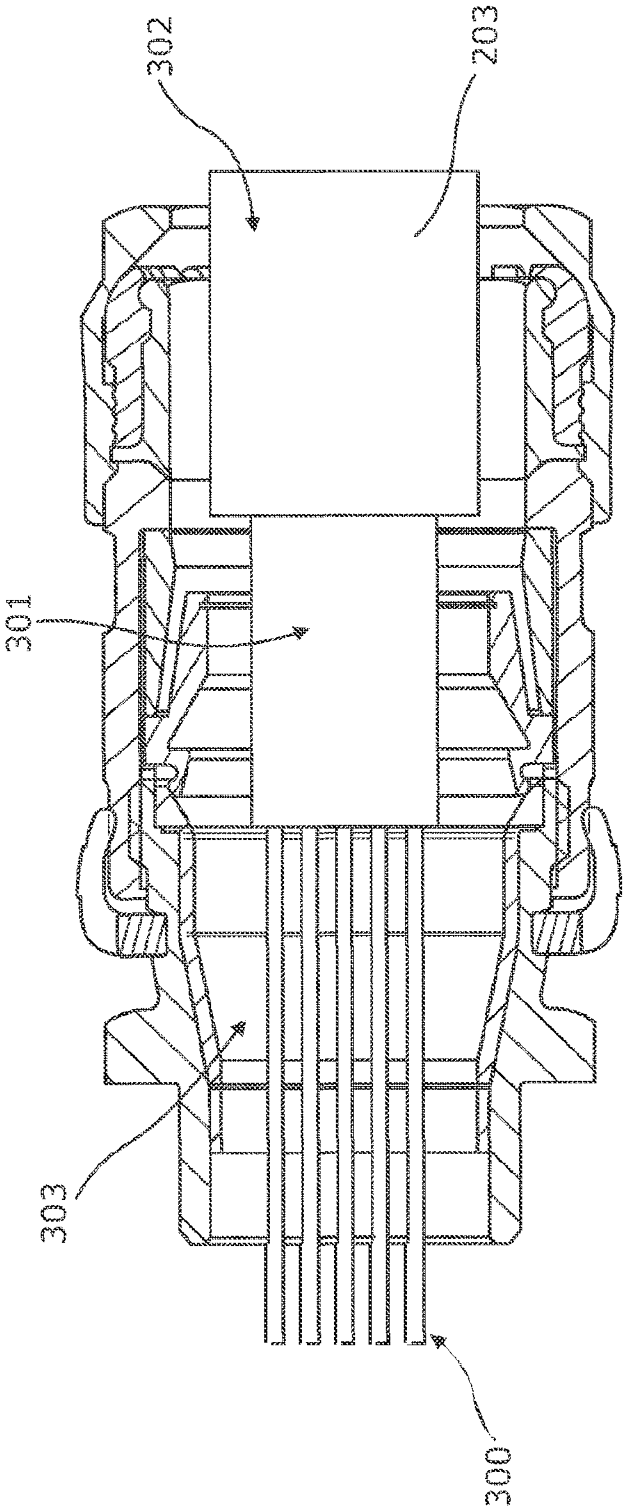
FIG. 8 shows a cross-section through the cable gland of FIG. 7, with a cable installed therein.

A further embodiment of the cable gland in accordance with the invention is shown in FIGS. 7 and 8 of the accompanying drawings. This functions in a similar manner to the cable gland of FIG. 3B; corresponding features are depicted with corresponding reference numerals to the embodiment of FIG. 1A to 1C, raised by 200.

FIG. 7 illustrates the cable gland 201 in assembled form, without a cable, in sectional side view. FIG. 8 illustrates the cable gland 201, in assembled form, with a cable 203 passing through it. The cable 203 typically includes a number of conducting cores 300, each having its own insulating jacket (not shown). The cores 300 are surrounded by an inner sheath 301. This, in turn, is surrounded by an insulating outer sheath 302. An earthing shield, such a braid or armour, is provided between the inner and outer sheath. FIG. 8 shows the settable sealing material 303 being used to seal the individual cores within the The cable gland 201 includes a body 205 formed by an annular wall 207. The wall 207 defines a passage 209 extending through the body 205 in an axial direction. The passage 209 extends from a first end 211 of the body 205 to a second end 213. Adjacent the first end 211, an external flange 215 is formed on the body for mounting the cable gland 201 to a wall, bulkhead or housing (not shown) through which the cable 203 is passing. In use, the first end 211 of the cable gland 201 is provided through an opening in the bulkhead, and the second end 213 is in an external environment.

Within the passage 209, near the first end 11, a sleeve-like sealing member is formed as a compound pot 219. Also within the passage 209 is a clamp 221 for gripping on to the external insulation cover 302 of the cable 203. The clamp 221 is provided between the compound pot 219, and the second end 213.

The body 205 is formed of a first part 225 and a second part 227. Each of the parts 225, 227 forms an axial portion of the body 205, such that each of the parts 225, 227 extends around the circumference of the passage 209, and along a portion of the length.

The first body part 225, also referred to as the entry, incorporates the first end 211 and the external flange 215, and receives the compound pot 219. Between the first end 211 and the external flange 215, the first body part 225 includes a cylindrical portion 229. This may include a screw thread or the like for receiving a nut to secure the gland to the bulkhead through which the cable passes.

FIG. 8 shows the settable sealing material 303 being used to seal the individual cores 300 within the cable 203 as in previous embodiments. As compared to the embodiment of FIGS. 3A to 3C, the compound pot 219 does not extend all of the way to the second end 211 of the passageway 209. It stops partially through the cylindrical section 229. This reduces the likelihood of getting the settable sealing material 303 on the threaded external part of the cylindrical portion 229.

As with the embodiment of FIGS. 3B, an outer surface 271 of the compound pot includes a ledge 281 formed in a rim 283, which engages with a step 285 formed in the inner surface 275 of the first body member 225, to retain against the pot 219 being pulled out in a direction towards the first end 211. The outer surface 271 is tapered inwards from the rim 283 towards the first end 211, to form a tapered region 295. The inner surface 275 of the first body portion 225 includes a matching tapered portion 297.

As such, the matching tapers of the compound pot 219 and the first body member 225 act as the first line of defense against ingress from the first end, forming a good seal, especially given that the compound pot 219 will be formed of a stiff compressible elastomer. Compression of the compound pot 219 will ensure a good seal between the two surfaces 271, 275. The ledge 281 and step 285 provide a second line of defense, especially if aggressively compressed on first installation. These seals negate the need for a separate flame path.

As before, when the compound pot 219 is filled with the settable sealing material 303, that material will sit against brass spigot 255. Having the settable sealing material 303 sit against this metallic element means that the resin can move no further backwards (towards the first end 213), which would not necessarily be the case if the settable sealing material were sitting on an elastomeric member.

The compound pot again uses the hooked portion 267 to clip onto and seal against the corresponding hooked portion 271 on the spigot 255. This allows for easy attachment of the compound pot 219 on the spigot 255, and forms a seal preventing settable sealing material escaping during installation.

An elastomeric wiper seal 375 forms a barrier between the inner sheath 301 and the bore of the spigot 255, further preventing the unset settable sealing material penetrating through the gland.

Figure 9:
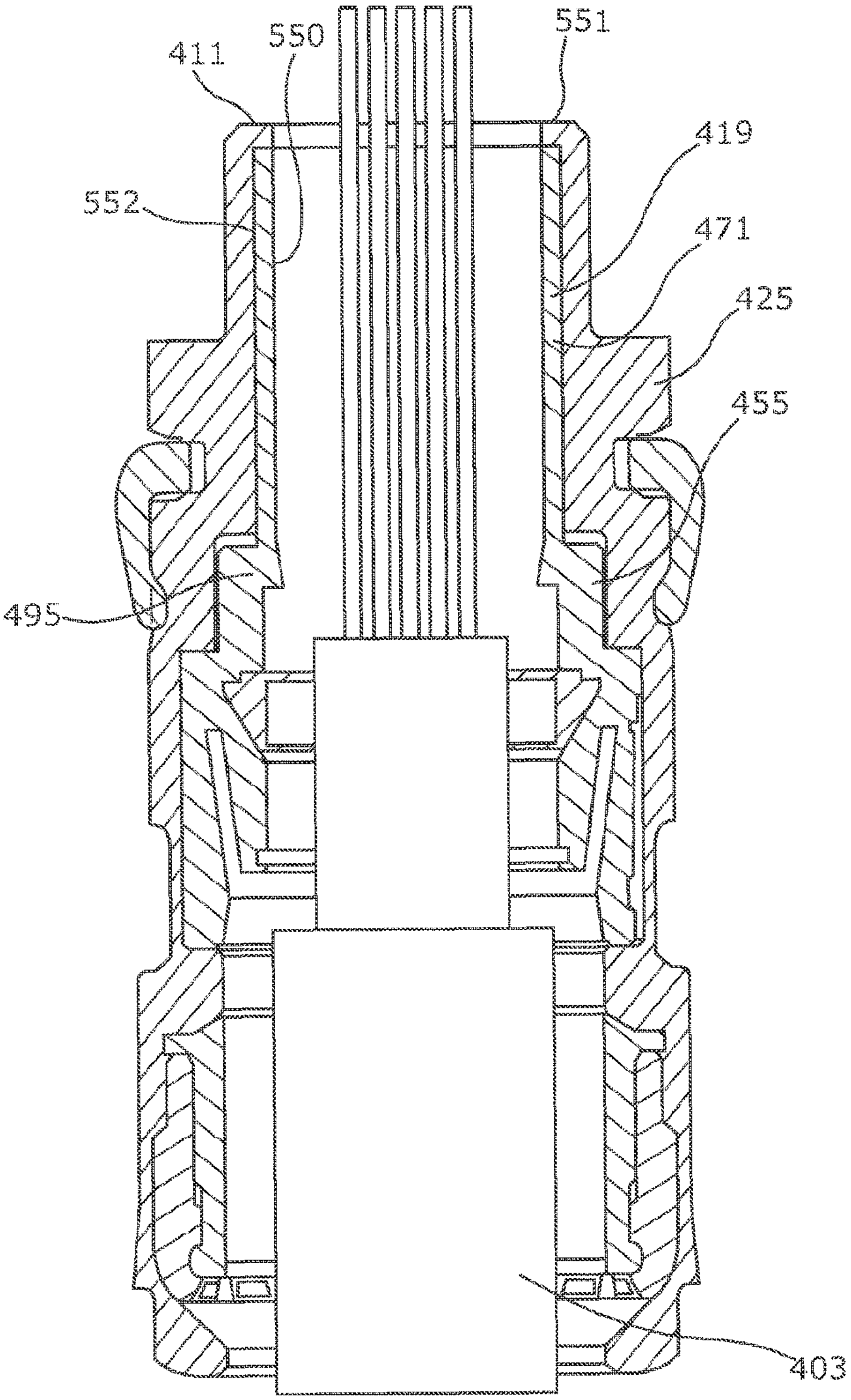
FIG. 9 shows a cross-section through a cable gland of another embodiment of the invention.

A further alternative embodiment of cable gland is shown in FIG. 9 of the accompanying drawings. In this embodiment, reference numerals corresponding to equivalent features from the embodiment of FIGS. 1A to 1C have been given corresponding reference numerals raised by 400.

In this embodiment, the compound pot 419 is of the form of a brass body, having a cylindrical outside surface 471 and a cylindrical passage 550 therethrough. It has a tapered 495, which tapers inwards in diameter away from the second end 411 (rather than outwards in the other embodiments). This tapered end 495 sits in spigot 455 to provide a seal, and prevents the contents of the pot being pushed out. The first body part 425 has a step reduction 551 in the internal diameter of its bore at the second end 411 to as to retain the compound pot 419. There is a clearance gap 552 between the compound pot 419 and the passage 209 of the first body part 425 to provide a flame path.

The outer surface 471 is entirely cylindrical, with no steps or shoulders; this is easy to machine, typically on a centreless grinder.

Figure 10:
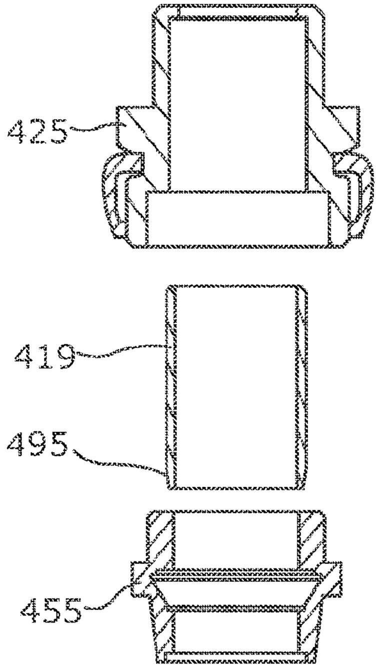
FIGS. 10 to 13 show cross-sectional views of the cable gland of FIG. 9 in sequential stages of assembly.
Figure 11:
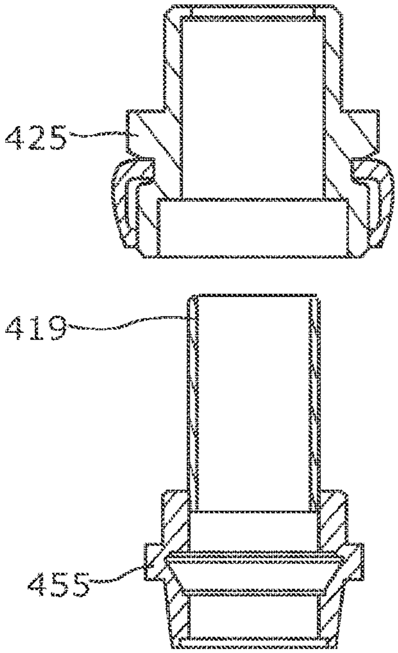
Figure 12:
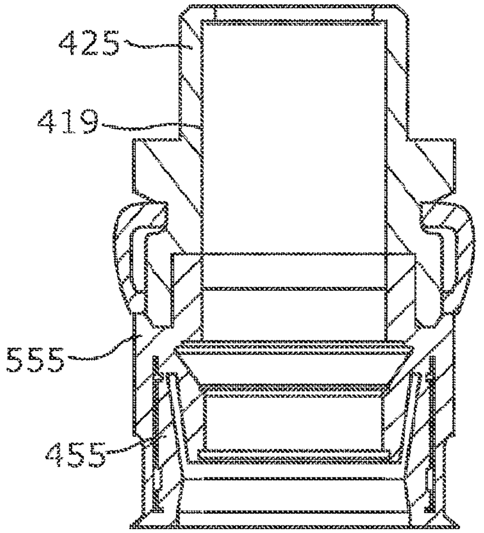
Figure 13:
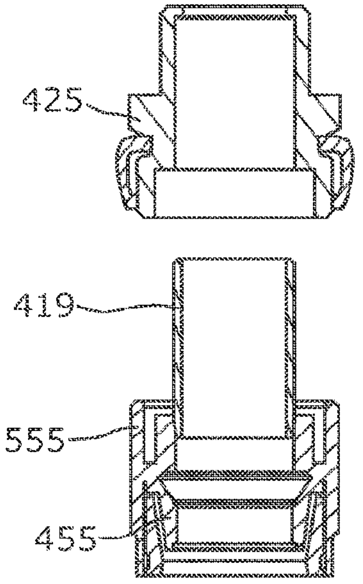
Figure 14:
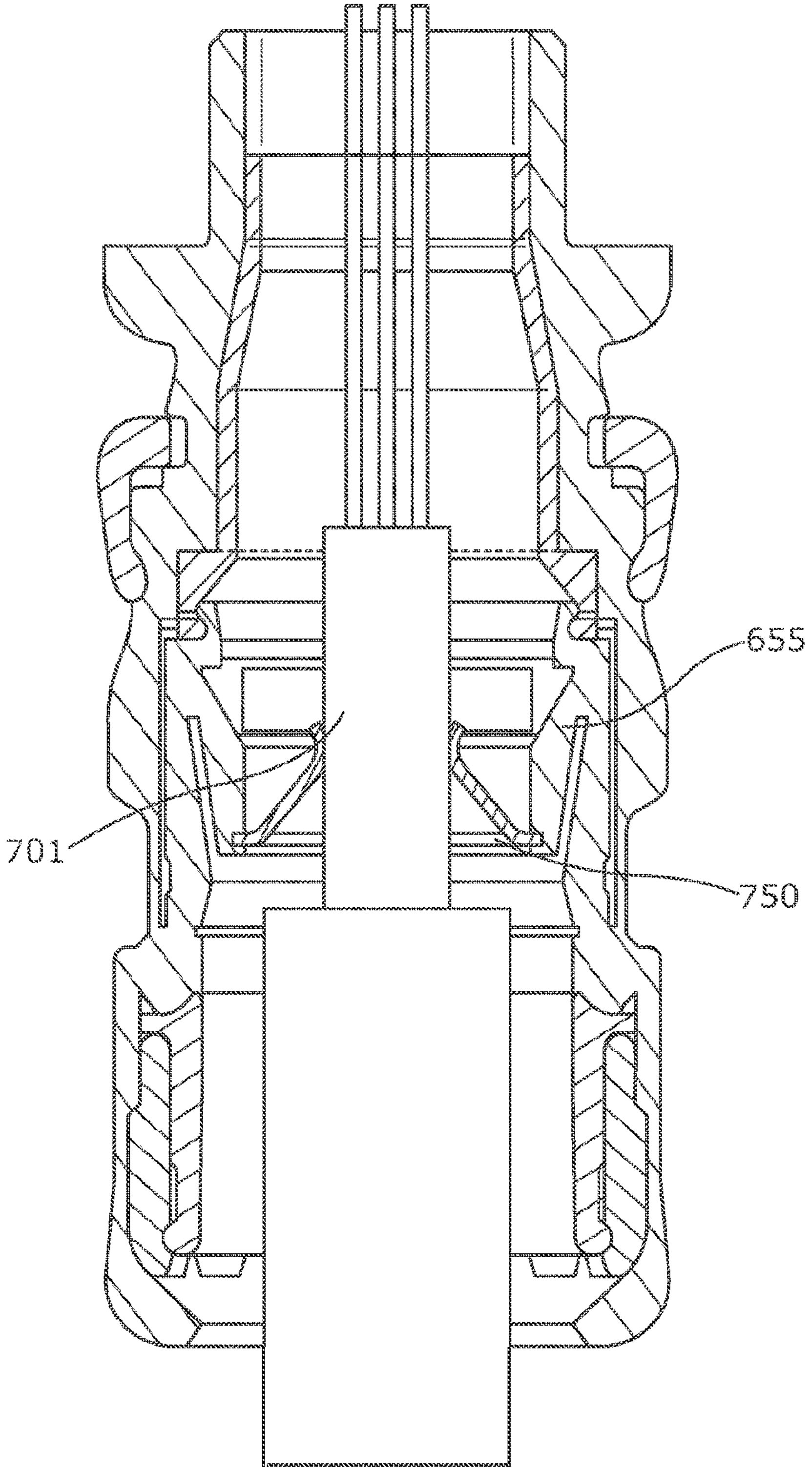
FIG. 14 shows a cross-section through a cable gland of another embodiment of the invention.
Figure 15:
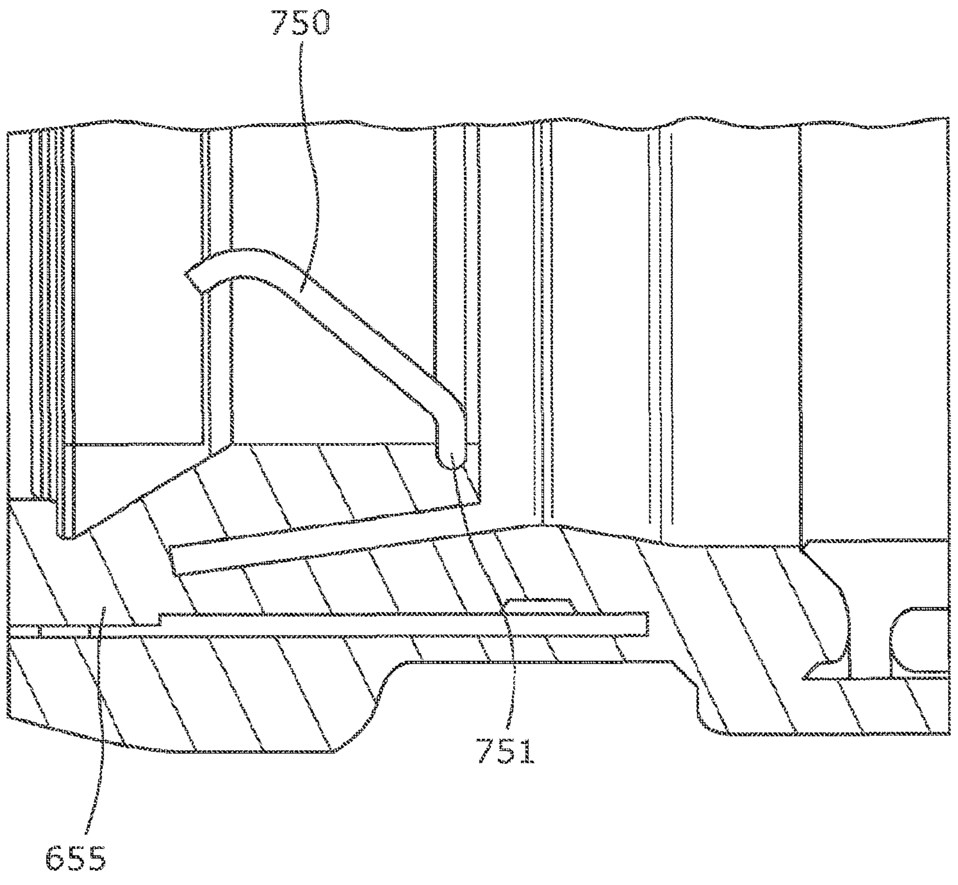
FIG. 15 shows an enlarged cross-sectional view of part of the cable gland of FIG. 14.

In use, the gland is assembled as shown in FIGS. 10 to 13. In FIG. 10, the first body part 425, compound pot 419 and spigot 455 are separate. In FIG. 11, the tapered end 495 is inserted into in the spigot 455. In FIG. 12, the first body portion 425 and a spigot retaining nut 555 are used to crimp the compound pot 419 to the spigot 455 (by the action of the step 551 on the compound pot 419. The first body portion 425 can then be removed (FIG. 13), leaving the compound pot 419 fixed to the spigot 455, ready to receive a cable 403 and a liquid settable sealing material 503. If, however, the settable sealing material 503 is a putty rather than a liquid, the cable 403 and settable sealing material 503 would be installed prior to crimping.

As discussed above in respect of the armour clamp, it is common to have an earth bond to connect an earthed sheath 701 of the cable to the metallic body of the cable gland. An alternative embodiment of such an earth bond is shown in a further embodiment of the invention shown in FIGS. 14 to 17 of the accompanying drawings. This embodiment functions as the embodiment of FIGS. 7 and 8 of the accompanying drawings; equivalent features to those of the embodiment of FIGS. 1A to 1C have been given corresponding reference numerals, raised by 600.

In this embodiment, a wire earthing clip 750 is provided in the spigot 655. This comprises a single length of bent conductive wire, received within a groove 751 in the spigot 655. Additionally or alternatively, it can be retained through soldering or gluing or by being crimped.

Figure 16:
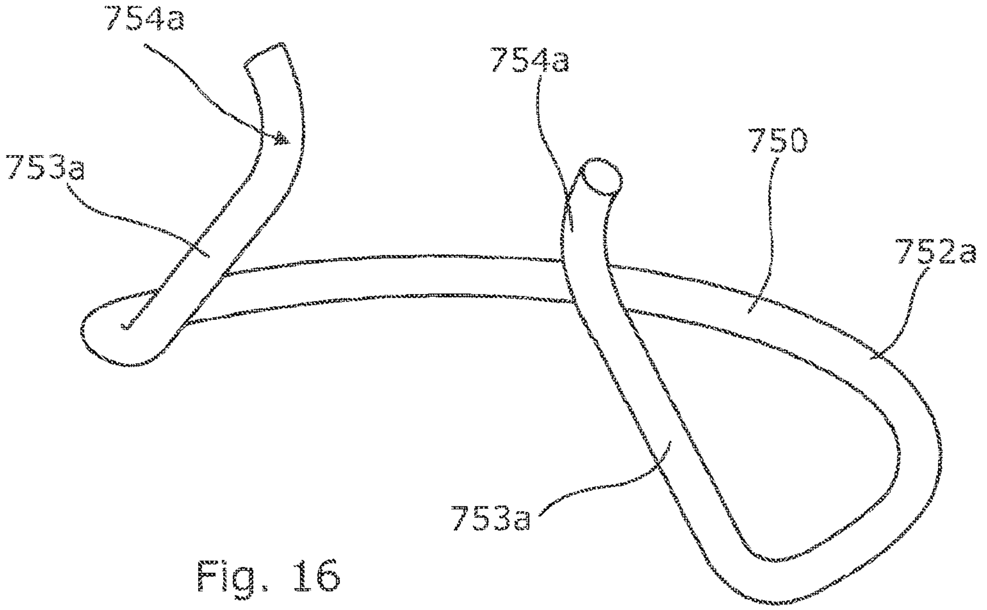
FIGS. 16 and 17 are perspective views of alternative forms of a wire clip used in the cable gland of FIG. 14.
Figure 17:
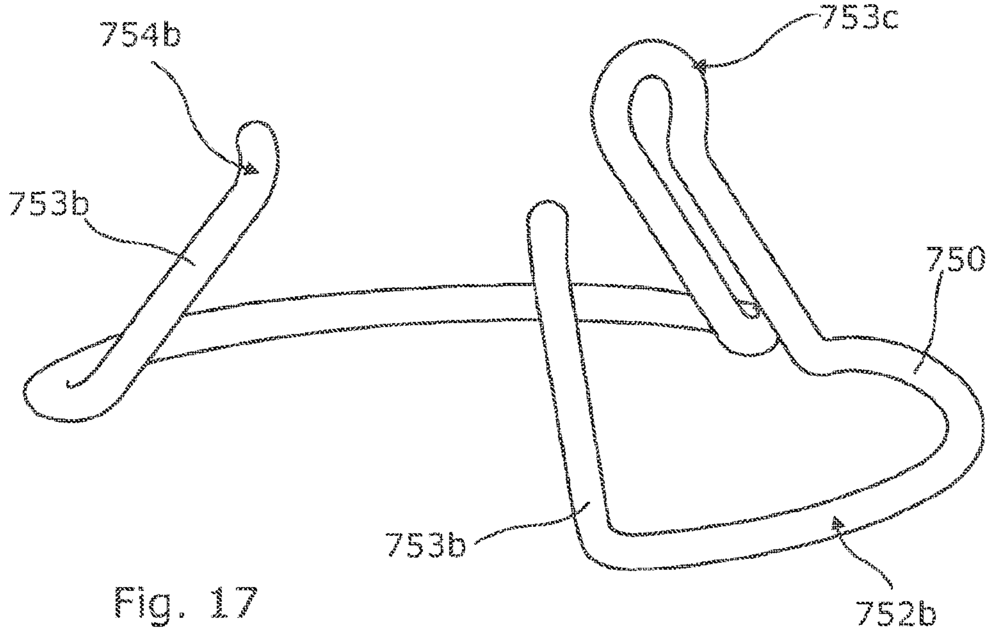

Two alternative forms of the wire earthing clip 750 are shown in FIGS. 16 and 17 of the drawings. In both cases, the clip 750 is formed of a base loop 752*a*, 752*b* of the form of a circular arc. From this depend a number of prongs formed as bends in the wire.

In FIG. 16, there are two prongs 753*a*, each formed in an end of the wire, bent away from the base loop 752*a* axially and radially inwards relative to the circular arc. The ends 754*a* of each prong 753*a* have a return bend 754*a*, so that the sheath 701 is only contacted by bent wire, not by the possibly sharp end.

In FIG. 17, there are still the two prongs 753*b* at either end 754*b* of the wire, but also an additional central prong 753*c* formed of a U-shaped deviation from the base loop 752*b*. This can centralise the wire earthing clip on the sheath 701.

The wire can be any conductive metallic wire. It may be tempered in order to increase its spring properties, and may be plated to improve conductivity.

Figure 4A:
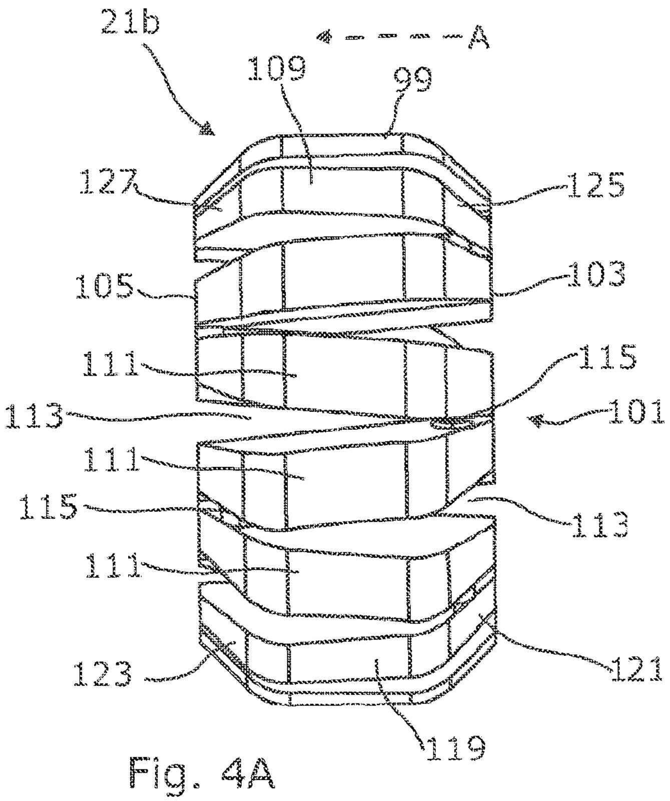
FIG. 4A illustrates a side view of the clamp of the cable gland of FIG. 1A.
Figure 4B:
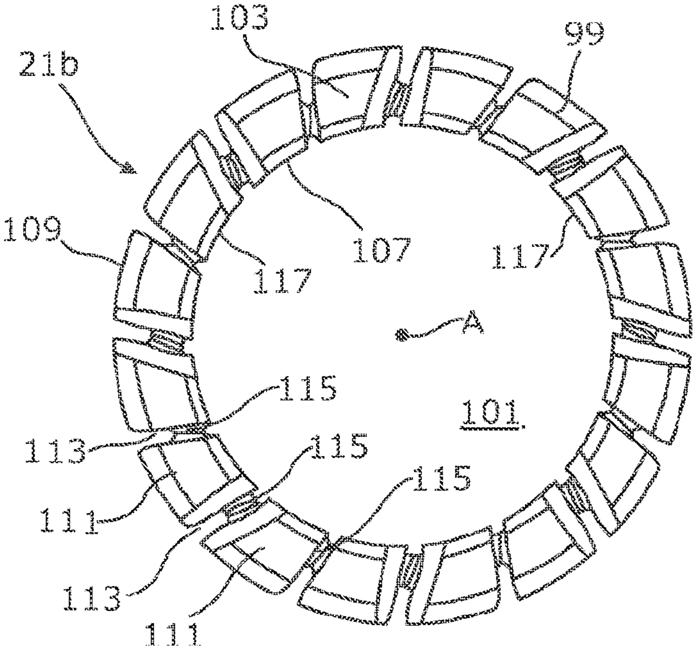
FIG. 4B illustrates an end view of the clamp of the cable gland of FIG. 1A.
Figure 4C:
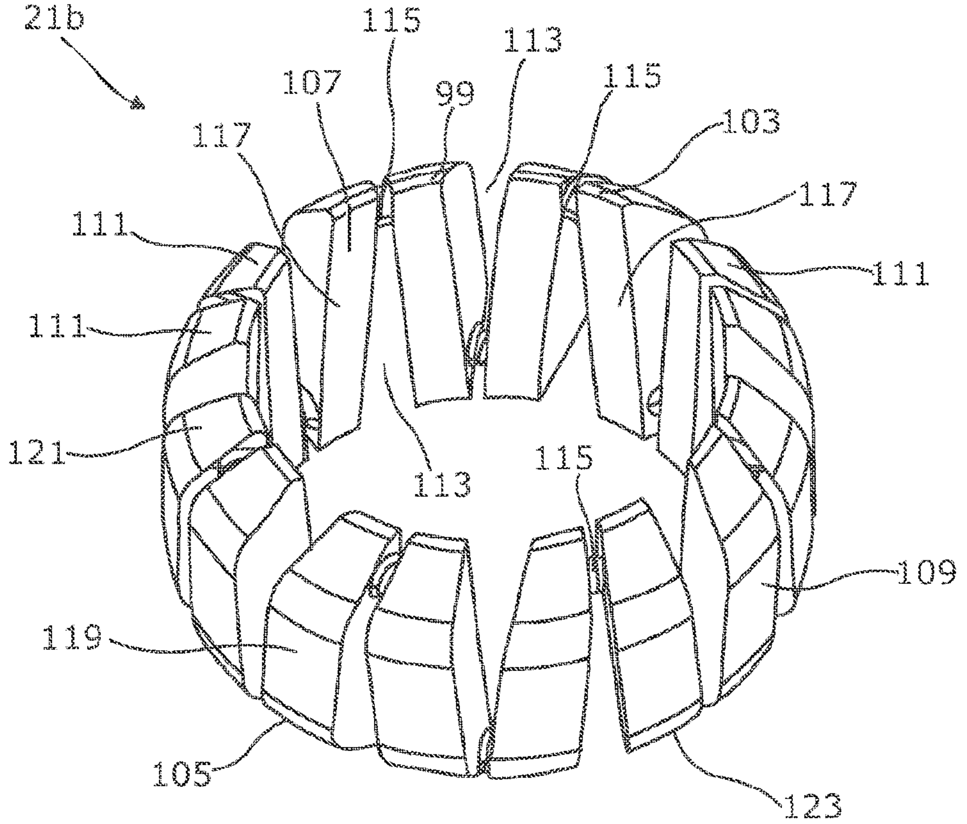
FIG. 4C illustrates a perspective view of the clamp of the cable gland of FIG. 1A.

Returning now to the embodiment of FIGS. 1A to 1C, as shown in FIG. 1B, the clamp 21 is formed of a clamping element 21*b*, provided around a cylindrical silicone sleeve 21*a*. FIGS. 4A to 4C illustrate the clamping member 21*b* in more detail. The sleeve 21*a* and clamping element 21*b* may be formed of separate parts, or a single unitary piece.

The clamping member 21*b* is formed of an annular body 99 defining a passage 101 having an axial length parallel to the axial direction A of the passage 9 of the cable gland 1. The passage 101 in the clamp body 99 extends between a first end 103 and a second end 105. The body has an inner surface 107 that engages the sleeve 21*a*, which in turn engages an insulating sleeve of the cable 3. The body also has an outer surface 109, radially opposing the inner surface 107.

The body 99 is formed of a number elongate finger portions 111. The finger portions 111 extend in the general direction from the first end 103 to the second end 105. However, the finger portions 111 do not extend parallel to the axial direction A. Instead each finger 111 also extends a short circumferential distance as it extends from the first end 103 to the second 105.

Adjacent fingers 111 extend in opposite circumferential directions. For example, if a first finger 111*a* extends clockwise, from the first end 103 to the second, a second finger 111*b*, circumferentially adjacent the first, extends anti-clockwise from the first end 103 to the second 105, and a third finger 111*c*, adjacent the second, extends clockwise. As such, tapering gaps 113 are formed between the fingers, with the taper for adjacent gaps extending in alternating directions (e.g. a first gap 113*a* narrows from the first end to the second, a second gap 113*b*, adjacent the first 113*a* widens from the first end to the second, and a third gap 113*c* adjacent the second 113*b* narrows again).

The gaps 113 are bridged by hinge sections 115 joining the fingers 111. The hinge sections 115 are flexible, and allow movement of the fingers 111 relative to each other. In the example shown, the hinge sections 115 are formed by live hinges, where the material of the body 99 is narrowed compared to the fingers 111.

One hinge section 115 is provided between each pair of fingers 111. The hinge sections 115 are also provided at the narrowest point of each gap 113, such that the hinge sections 115 are provided at alternating ends. Therefore, using the above example, the hinge section 115*a* between the first finger 111*a* and second finger 111*b* is provided at the second end 105, the hinge between the second finger 111*b* and third finger 111*c* is provided at the first end, and so on.

Each finger has a flat gripping surface 117, facing the sleeve 21*b*, and forming a part of the internal surface 107 of the body 99. The gripping surface 117 is substantially a parallelogram in shape, and provide a large surface area for gripping the cable 3. Each of the gripping surfaces 117 has a pair of parallel spaced sides extending from the first end 103 and the second end 105. The arrangement of the fingers 111 to be non-parallel to the axial direction A is such that each edge travels a short distance around the circumference of the passage.

On the outer surface of the body has a flat central region 119, with tapered regions 121, 123, formed at either end. In these tapered regions 121, 124 the thickness of the body 99 narrows towards the respective end 103, 105. As such, the ends comprise angled surfaces 125, 127.

In use, the clamp 21 is fitted within the part of the passage formed by the second body portion 27. The cable is provided through the clamp 21, such that the sleeve 21*a* engages the cable, as discussed above and the clamping member 21*b* exerts a gripping force on the cable 3, through the sleeve 21*a*.

The annular ring 69 includes an angled surface 129 that corresponds with the angled end 125 of the clamp 21, and the axial surface 63 of the spigot retaining nut 47 is similarly angle to engage the end 127 of the clamp 21. As discussed above, when the gland 1 is assembled, and the body parts 25, 27 are screwed together. Tightening the screw thread applies compression between the first end 11 and the second end 13 of the gland 1. This compression causes the clamp 21 to engage with the corresponding driving surfaces 63, 129 to compress the clamp 21 in an axial direction. This causes the clamp 21 deform, reducing the diameter of the passage 101 through the clamping member 21*b*, causing it to engage with and exert a gripping force on the cable. When the cable is gripped by the clamp 21 in this way, and the cable 3 is moved laterally, the clamp 21 engages either of these clamp driving surfaces 63, 129, which prevents movement of the cable 3. The first and second body portions 25, 27 and the clamp may be sized and joined such that there is no lateral movement when a lateral force is applied, and the clamp 21 is always in contact with the clamp driving surfaces 63, 129.

Due to one or more of the shape of the fingers 111, alternating shape of the gaps 113, alternating ends of the hinges 115, and the driving surfaces 63, 129 at both ends of the clamps, the clamp provides an even gripping force over its axial length.

The clamp 21 may accommodate cables having a range of diameters. The variation in cable size is accommodated by increasing the amount of compressive force between the ends 11, 13 of the gland 1, by varying the tightening of the screw thread between the body portions 25, 27. This varies the deformation of the clamp 21. Thus, a wider cable 3 requires less compressive force for the clamp to grip 21 the cable 3.

In other examples, different clamps 21 may also be provided for different diameter cables. For example, it may be that a single clamp 21 can accommodate cables 3 having a diameter within a first range, but to accommodate cables outside the first range, a separate clamp 21, having different size is provided. Again, this second clamp may be able to accommodate cables having diameter in a second range, by varying the compressive force on the clamp 21. The first and second ranges may or may not overlap.

The clamping force exerted by the gripping surfaces 117 is such that large forces can be resisted by the clamp 21. The clamp 21 may also provide some ingress prevention protection, by the action of the sleeve 21*a* engaging the cable around its diameter.

In one example, the clamp may achieve 100% pull-out force as defined by the International Electrotechnical Commission (IEC) standards (IEC 60079-0:21012+A11:2013). The IEC standards define an axial force that should be resisted by the clamp. The force is dependent on the diameter. The percentage indicates what level of that force a clamp may resist.

Figure 5:
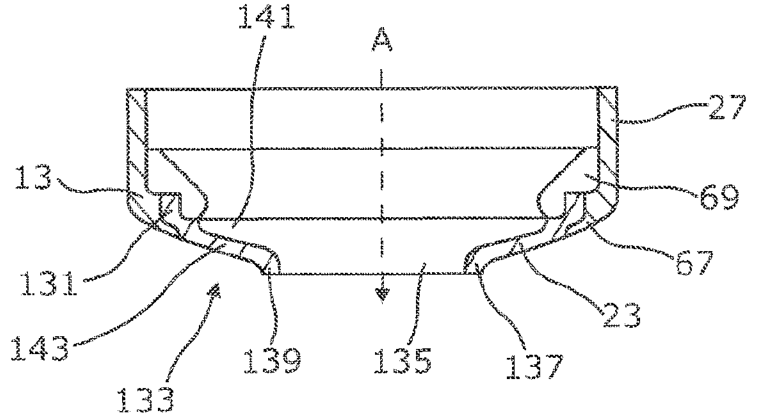
FIG. 5 illustrates a sectional side view of an ingress prevention seal of the cable gland of FIG. 1A.

FIG. 5 illustrates a first example of an ingress prevention seal 23. The seal 23 is annular in shape, and is integrally joined to the second end 13 of the body 5 of the cable gland 1 (and is thus joined to the back nut 27), such that the seal is external to the body 5.

The ingress prevention seal 23 has an annular retaining lip 131 extending around the circumference of the second end 13 of the body 5. The retaining lip 131 is located on a corresponding lip 67 formed in the body 5. The retaining lip 131 prevents movement of the seal in the axial direction from the first end 11 to the second end 13. The annular ring 69 sits against the retaining lip 131, and, when the gland 1 is assembled with the clamp 21 in place prevents movement of the seal in the opposite direction. The seal 23 may also be secured to the body by adhesive, bonding, over-moulding and the like.

The seal 23 includes a sealing portion 133 extending across the second end 13 of the body 5, in the boundary defined by the retaining portion 131. A centrally formed opening 135, defined by a mouth 137 is provided through the sealing portion 133. A thickened lip 139 is formed at the mouth 137. In use, the mouth 137 engages with the cable 3, to form a seal.

In the example shown in FIG. 5, the sealing portion 133 extends axially, as well as radially, such that it forms a truncated cone 143 with an empty volume, or void 141, defined within the cone. Prior to insertion of a cable, the truncated cone 143 extends into the passage 9 of the gland 1. However, the act of inserting the cable 3, in a direction from the first end 11 towards the second end 13 flips the seal 23, so the cone 143 extends outside the passage.

The ingress prevention seal 23 forms a seal between the body 5 of the gland 1 and the insulating outer sheath of the cable 3 to prevent ingress of material into the enclosure to which the gland 1 is fitted, from the external environment.

Figure 1D:
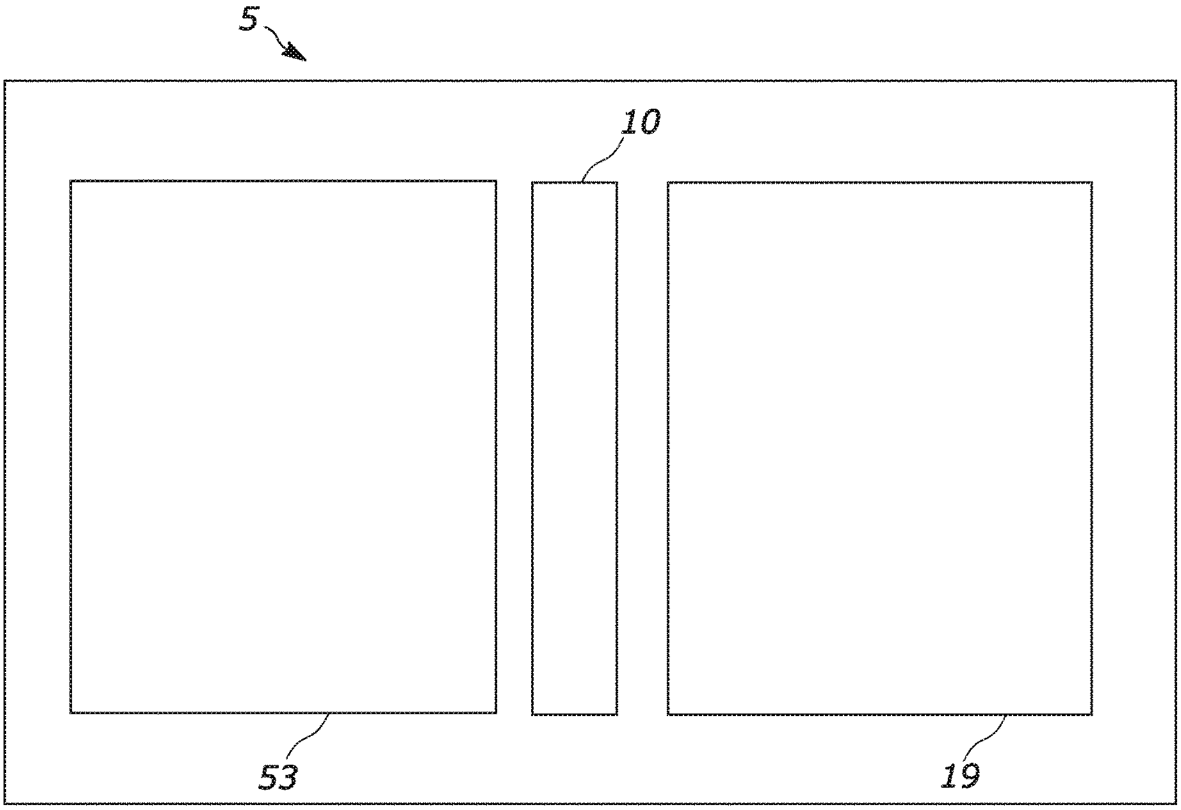
FIG. 1D is a schematic view of the cable gland of FIG. 1A, illustrating an explosion protection seal.

As discussed above, in addition to the ingress prevention seal 23, the cable gland 1 may include separate explosion protection seals 10. The explosion seals 10 are provided in the body 5 of the gland 1, between the armour clamp 53 and compound pot 19 (see e.g., FIG. 1D), and form a seal between the cable gland 1 and the insulating inner sheath of the gland 1. Any suitable type of explosion seal 10 may be used. For example, the explosion seal 10 may be a compressive seal, such as an elastomeric ring, which is compressed onto the cable as the gland 1 is tightened. Alternatively, the seal 10 may be non-compressive, such a silicone cone supported by a cage.

The explosion seals 10 prevent explosive force from escaping the enclosure, into the external environment. The explosion protection seals 10 are received within the body and are illustrated only in the schematic view of FIG. 1D, for clarity. It will be appreciated that the plug formed in the compound pot 19 also provides some prevention against explosive force escaping the enclosure, between the cores of the cable 3.

Figure 6A:
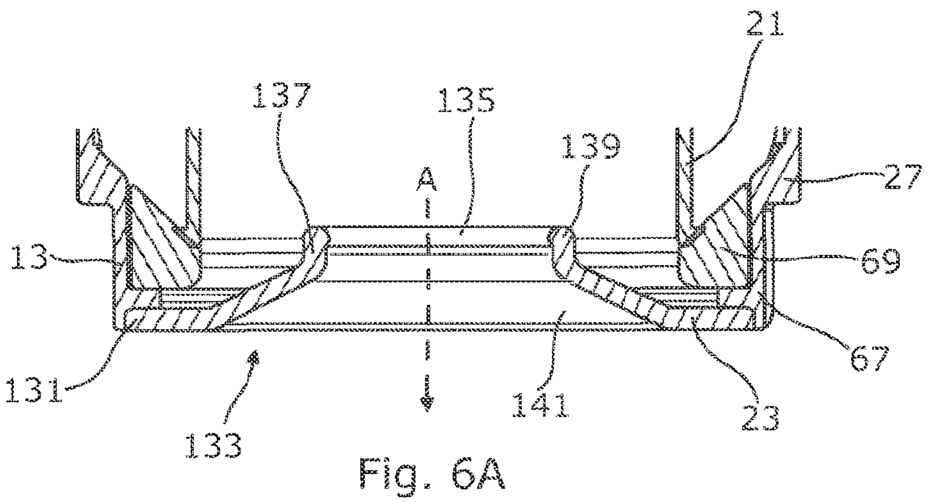
FIG. 6A illustrates a sectional side of a first alternative ingress prevention seal.
Figure 6B:
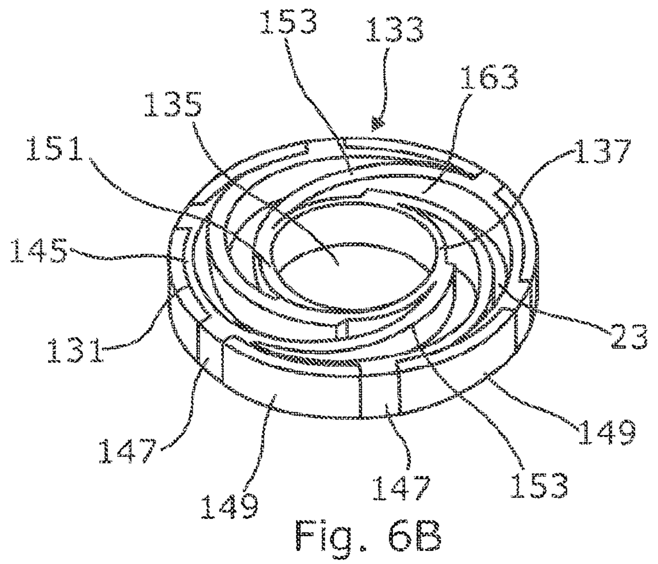
FIG. 6B illustrates a perspective a second alternative ingress prevention seal.
Figure 6C:
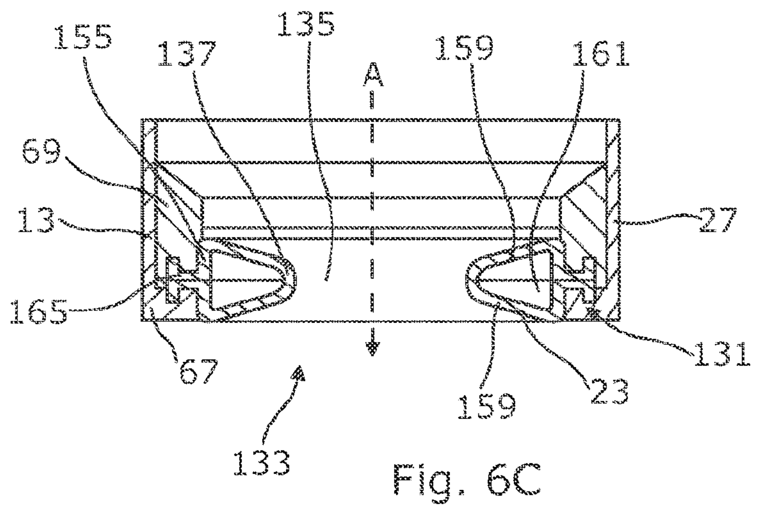
FIG. 6C illustrates a sectional side of a third alternative ingress prevention seal

FIGS. 6A to 6C illustrate alternative arrangements for the ingress prevention seal 23.

The example shown in FIG. 6A is similar to the example shown in FIG. 5. However, in this example, the seal 23 is over-moulded onto the lip 67 in the body 5. The annular ring 69 does not act to retain the seal 23, but is still required to provide a driving surface 129 for the clamp 21, such that there is sufficient travel in the gland for the clamp to engage a range of different cables diameters. During the process of over-moulding, the annular ring 69 is not in place, in order to provide a void inside the gland for the material of the seal 23 to move into. Once the over-moulding 1*s* complete, the seal is pulled out of the gland 1, and the ring is then fitted into place.

In the example shown in FIG. 6B, the seal 23 is not conical in shape. In this example, the seal 23 includes retaining portion 131 formed of an annular wall 145 around an outer circumference of the seal 23, and along the axial direction A. A number of projections 147 extend radially from the wall 145, and engage m corresponding projections 149 formed in the end 13 of the body 5, to join the seal 23 to the body 5. Again, the seal 23 may also be joined to the body 5 by adhesive and the like.

In the example shown in FIG. 6B, the sealing portion 133 includes an inner annular wall 151 arranged concentrically within the retaining wall 145, and extending along the axial direction A, and a radially extending side wall 159 between the retaining wall 145 and inner wall 151. The annular wall 151 defines the opening 135 through which the cable 3 passes. A number of arced ribs 153 extend between the walls 145, 151, extending axially from the side wall 159, defining voids or volumes 163 between the ribs 153 and walls 145, 151. The ribs 153 also provide strength in the axial direction A, preventing the silicone element from being pulled into the gland. For extra strength, the ribs can be part of the over-moulded plastic ring, rather than just silicone.

The seal 23 shown in FIG. 6C includes an outer annular wall 155. A pair of axially spaced sidewalls 159 extend from the axial edges of the outer wall 155, and meet at the mouth 137, to define the opening 135. As such, the outer wall 155 and sidewalls 159 define an annular, enclosed void 161.

An annular projection 165 with a "T" shaped cross section extends radially outward from the outer wall 155. This engages a corresponding slot 167 in the body 5, to retain the seal 23. Again, the seal 23 may also be joined to the body 5 by adhesive and the like.

The seals 23 shown in FIGS. 5 and 6A to 6C are non-compressive, in that they do not require tightening of the body parts 25, 27 or action of the clamp to form the seal. Therefore, if the clamp 21 loosens or breaks, the cable 3 can move axially, without the seal being compromised. Any compression is accommodated by the voids 141, 161, 163, rather than the cable 3.

The body 5, spigot retaining nut 47, armour clamp ring 53, spigot 55 and annular ring 69 are made of brass, or other suitable materials. The materials should be selected to operate in a temperature range of −60 degrees Centigrade to +135 degrees Centigrade, and a pressure range of 450 psi to 3000 psi (approximately 3 MPa to 21 MPa) At least the armour clamp ring 53, and body 5 should be formed of conductive material, to provide an earth path for the shielding of the cable 3.

The pot 19 may be formed of any suitable material transparent or translucent material that enables the plug to be inspected. The pot 19 should be sufficiently rigid to form a sleeve, but sufficiently deformable to form a seal. For example, the pot 19 may be silicone The clamp 21 should be insulating, as it grips the insulating outer sheath of the cable. Furthermore the clamp 21 should be formed of a resiliently deformable material. Any suitable insulating material may be used to form the clamp 21. For example, the clamp may be formed of silicone rubber, thermoplastics and the like. The sleeve 21*a* and clamping member 21*b* may be of the same or different material. In some examples, the clamp 21 may have metallic parts, but these would require grounding.

The ingress prevention seal 23 may be formed of rubber silicone, as discussed above. Alternatively, the ingress prevention seal 23 may be formed of other suitable materials, such as silicone rubber, or any other rubberised materials, such as thermoplastic elastomers (TPEs), Neoprene, ethylene propylene diene monomer rubber (EPDM) and the like.

The arrangement of the body 5 discussed above is given by way of example only. The body 5 may be formed of two parts 25, 27, but arranged in a different manner. For example, in the embodiment discussed above, a part of the entry (the first body part 25) is received within the back nut (the second body part 27). This need not necessarily be the case, and the back nut 27 may be received within the entry 25, or other arrangements may be adopted. Furthermore, the spigot 55 and spigot retaining nut 47 may be secured in the passage 9 in any other suitable manner.

Furthermore, the clamp driving surfaces 125, 127 may be formed m any suitable manner.

In some examples, some of the components may be formed in a single component. For example, one or both of the clamp driving surfaces 125, 127 may be formed integrally with one of the body parts 25, 27. Furthermore, the spigot retaining nut 47 may be formed integrally with one of the body parts.

In other examples, further components, not discussed, may be received in the passage 9.

The pot 19 discussed above is given by way of example only. The pot may have any suitable shape to enable it to be slid out of the passage 9 for inspection, and to form a seal under compression. For example, only a portion of the outer surface 71 may be tapered. Furthermore, in some examples, the taper on the inner surface 75 may match the taper on the outer surface 71.

Similarly, the clamp 21 and clamping member 21*b* discussed above are given by way of example only. Any suitably shaped longitudinally extending portions may be used instead of the fingers 111 discussed above, such that the clamp 21 forms a collet style body 99, with correspondingly shaped gaps 113. Similarly, any suitable hinges 115 may be used at alternating ends 103, 105 of the clamp body 99.

In some examples, the clamp 21 the sleeve 21*a* or a clamp ring (not shown) may help locate the clamp radially and axially within the passage 9. Furthermore, any suitable projection, extending into the passage 9, may be used as driving surfaces for the clamp 21. In some examples, the sleeve 21*a* may be omitted, and the clamping member may directly grip the cable.

The clamp 21 discussed above also provides some ingress prevention function. However, this need not be the case, when a separate ingress prevention seal is provided.

In use, the clamp 21 grips onto the insulating outer sheath of the cable 3. Within the passage 9 of the cable gland body, the outer sheath is stripped away so that the armour clamp 53 can grip the earthing shield. After the armour clamp 53, the inner sheath is also stripped, such that for at least a portion of the compound pot, the plug is formed around the insulating jackets of the individual conducting cores. At least a portion of the compound pot 19 may also form a plug around the insulating inner sheath.

In the above description, the cable gland 1 includes an ingress prevention seal 23 as discussed above, a clamp 21 as discussed above, a sealing pot 19 as discussed above and two part body 5 as discussed above. It will be appreciated that a cable gland 1 may include any one of the parts as described above, or any combination of two or more of the parts as described above, and the other parts may be replaced by any suitable alternative. For example, any ingress prevention seal may be used instead of the one discussed above. The ingress prevention seal may be compressive or non-compressive. Similarly, any suitable clamp may be used, instead of the one discussed above. Furthermore, the sealing pot and body may also be arranged in any suitable manner, and may have any number of parts.

Figure 18:
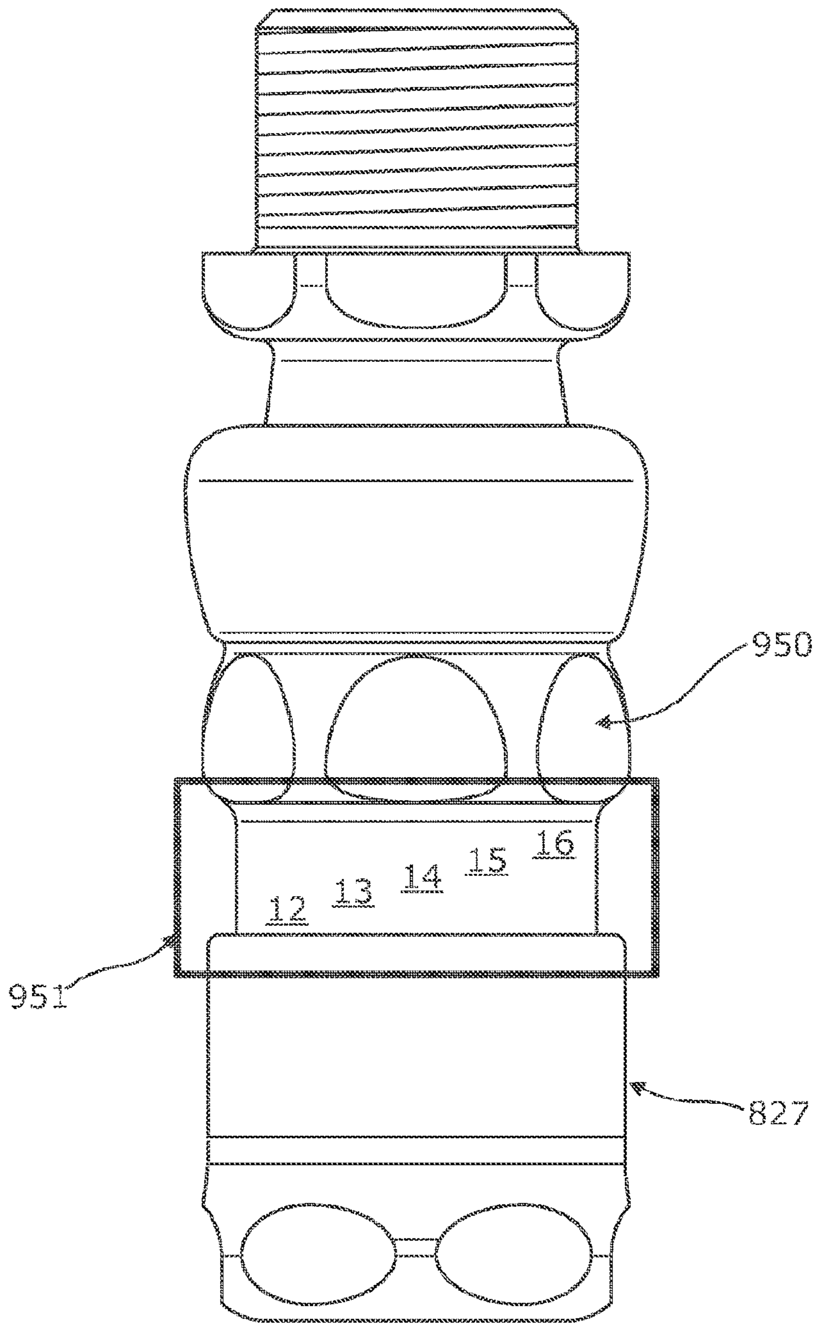
FIG. 18 shows a plan view of a cable gland of another embodiment of the invention.
Figure 19:
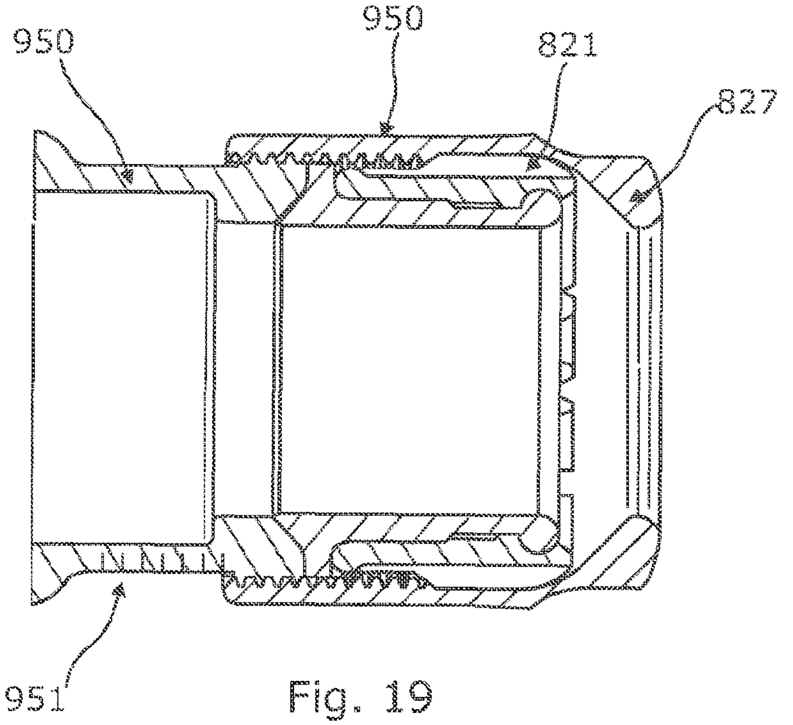
FIGS. 19 and 20 are cross-sections through the cable gland of FIG. 18, with the back nut in different positions.
Figure 20:
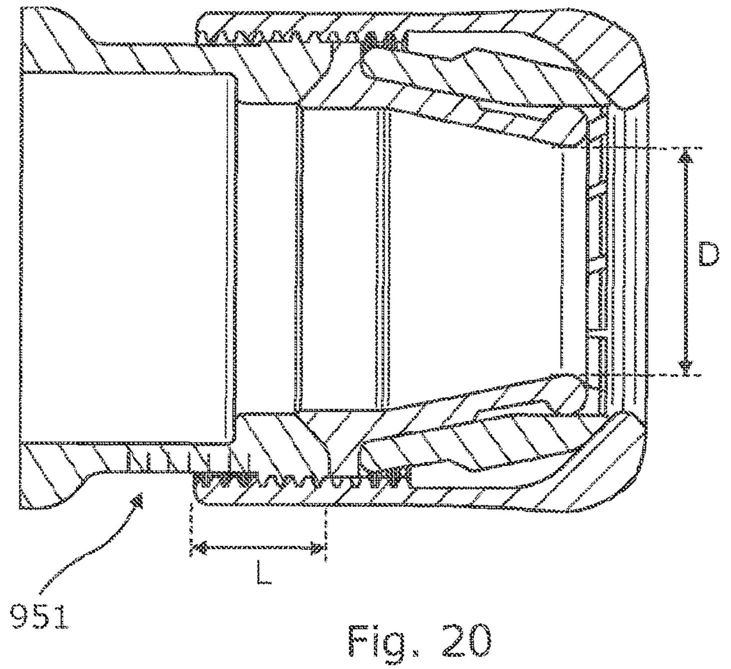

In a further embodiment of a cable gland shown in FIGS. 18 to 20 of the accompanying drawings, we show how it can be indicated to a user of the cable gland that the cable gland has been appropriately tightened. In this embodiment, equivalent features to those of the embodiment of FIGS. 1A to 1C have been given corresponding reference numerals, raised by 800.

In this embodiment, attention will be paid to the back nut 827, which here is shown as tightening onto a middle nut 950 (although it is equally applicable if the back nut 827 directly tightened onto the first body portion or entry as discussed in the preceding embodiments. As with the embodiment of FIGS. 1A to 1C, tightening of the bank nut acts to compress a clamp 821. We have appreciated that the compression of the clamp and so the reduction in the diameter D of clamp 821 is linked to the linear travel L of the back nut 827.

As such, it is possible to mark the middle nut 950 (or whichever component the back nut 827 tightens onto) with indicia 951 that give an indication of the diameter of the clamp 821. As such, a user can know that if they tighten the back nut to the diameter of the cable being used, then the clamp 821 should have correctly engaged the cable. Whilst the relationship between clamp diameter and back nut travel may not be entirely consistent (particularly with varying hardness cables), the scale will give at least a rough indication of the correct position for a given diameter cable.

The invention has application including but not limited to

Gland assemblies for armoured electric cable or fibre optic cable or pipes or conduits;

Gland assemblies for non-armoured electric cable or fibre optic cable or pipes or conduits;

Barrier gland assemblies for electric cable or fibre optic cable or pipes or conduits; and Non-barrier gland assemblies for electric or fibre optic cable or pipes or conduits.

While the invention has been described with reference to exemplary embodiments, it will be understood that we do not intend the invention to be limited thereto and that various modifications and changes may be made without departing from the principles and concepts of the invention, Other modifications and changes that can be made without departing from the principles and concepts described herein will be apparent to those skilled in the art and arc covered herein.

It will also be understood that the invention extends to and includes any novel feature or combination of novel features described herein.

What is claimed is:

1. A cable gland comprising:

a cable gland body having a wall defining a passage extending in an axial direction from a first end to a second end, the passage of the cable gland body arranged to receive a cable;

an ingress prevention seal arranged to seal between the cable gland body and the cable passing therethrough; and an explosion protection seal received within the cable gland body;

wherein the cable gland body includes:

a first body part incorporating the first end of the cable gland body; and a second body part, secured to the first body part, and incorporating the second end of the cable gland body;

wherein a clamp and the explosion protection seal are received within the passage of the cable gland body; and wherein the cable gland further comprises: an armour clamp within the passage of the cable gland body, arranged to grip an earthing shield of a cable passing through the cable gland body.

2. The cable gland of claim 1, the explosion protection seal may be a compressive seal formed as an elastomeric ring.

3. The cable gland of claim 1, wherein the explosion protection seal is disposed between the armour clamp and a cable gland sealing member received within the passage of the cable gland body.

4. The cable gland of claim 1, wherein the ingress prevention seal is integrally joined to the second end of the cable gland body and is disposed at least partially external to the passage.

5. The cable gland of claim 1, wherein the ingress prevention seal has a first seal end and a second seal end with a larger width than the first seal end, wherein a truncated cone portion is formed between the first seal end and the second seal end and forms a seal pathway configured to receive the cable.

6. The cable gland of claim 1, wherein the ingress prevention seal includes an outer retaining wall, an inner retaining wall, and an arced rib extending in an axial and circumferential direction between the outer retaining wall and the inner retaining wall.

7. The cable gland of claim 1, wherein the first body part includes a first screw thread and the second body part includes a second screw thread configured to mate with the first screw thread.

8. A cable gland comprising:

a cable gland body having a wall defining a passage extending in an axial direction from a first end to a second end, the passage of the cable gland body arranged to receive a cable;

adjacent the first end of the cable gland body, a cable gland sealing member received within the passage of the cable gland body and comprising a sleeve slidably received within the passage, the sleeve arranged to receive a settable sealing material for forming a seal to a cable passing through the sleeve;

an explosion protection seal received within the cable gland body;

wherein the cable gland body includes:

a first body part incorporating the first end of the cable gland body; and a second body part, secured to the first body part, and incorporating the second end of the cable gland body;

wherein a clamp and the explosion protection seal are received within the passage of the cable gland body; and wherein the cable gland further comprises: an armour clamp within the passage of the cable gland body, arranged to grip an earthing shield of the cable passing through the cable gland body;

wherein the explosion protection seal is disposed between the armour clamp and the cable gland sealing member.

9. The cable gland of claim 8, the explosion protection seal may be a compressive seal formed as an elastomeric ring.

10. The cable gland of claim 8, wherein the first body part includes a first screw thread and the second body part includes a second screw thread configured to mate with the first screw thread.

11. The cable gland of claim 8, wherein the sleeve has a first sleeve end with a first diameter, a second sleeve end with a second diameter, and a tapered portion extending between the first sleeve end and the second sleeve end.

12. The cable gland of claim 8, further comprising a spigot received in the passage of the cable gland body and means for fixing the spigot in the passage of the cable gland body such that the spigot is arranged to locate the sleeve, and wherein the cable gland sealing member and the spigot include correspond hooking projections, arranged to connect the sleeve to the spigot and the spigot includes a seal to prevent escape of the settable sealing material from the sleeve.

13. The cable gland of claim 8, further comprising:

an ingress prevention seal arranged to seal between the cable gland body and the cable passing therethrough, the ingress prevention seal includes, an annular retaining portion arranged to be sealingly secured to an end of a wall of the cable gland body, such that the ingress prevention seal is fitted outside the cable gland body, a sealing portion within the annular retaining portion, and an aperture formed in the sealing portion, the aperture defined by mouth in the sealing portion, arranged to engage and grip the cable passing through the aperture, to form another seal and a void or open space in a radial space between the mouth and the annular retaining portion; and a cable gland clamp received in the passage of the cable gland body, and arranged to grip the cable passing through the passage of the cable gland body to prevent axial movement of the cable;

wherein the ingress prevention seal is separate from the clamp.

14. The cable gland of claim 8, wherein the cable gland comprises a tightening means to apply compression between the first end of the cable gland body and the second end of the cable gland body, wherein applying compression between the first and second ends of the cable gland body compresses the cable gland sealing member, and wherein an outer surface of the cable gland sealing member forms a seal with the cable gland body, under compression.

15. A cable gland comprising:

a cable gland body having a wall defining a passage extending in an axial direction from a first end to a second end, the passage of the cable gland body arranged to receive a cable;

adjacent the first end of the cable gland body, a cable gland sealing member received within the passage of the cable gland body and comprising a sleeve slidably received within the passage of the cable gland body, the sleeve arranged to receive a settable sealing material for forming a seal to the cable passing through the sleeve; and an ingress prevention seal arranged to seal between the cable gland body and the cable passing therethrough;

wherein the ingress prevention seal is integrally joined to the second end of the cable gland body and is disposed at least partially external to the passage of the cable gland body; and wherein the ingress prevention seal has a first seal end and a second seal end with a larger width than the first seal end, wherein a truncated cone portion is formed between the first seal end and the second seal end and forms a seal pathway configured to receive the cable.

16. The cable gland of claim 15, wherein the ingress prevention seal includes an outer retaining wall, an inner retaining wall, and an arced rib extending in an axial and circumferential direction between the outer retaining wall and the inner retaining wall.

17. The cable gland of claim 15, a first body part incorporates the first end of the cable gland body, a second body part, secured to the first body part, and incorporating the second end of the cable gland body, and wherein the first body part includes a first screw thread and the second body part includes a second screw thread configured to mate with the first screw thread.

18. The cable gland of claim 15, wherein the sleeve has a first sleeve end with a first diameter, a second sleeve end with a second diameter, and a tapered portion extending between the first sleeve end and the second sleeve end.

19. The cable gland of claim 15, further comprising a spigot received in the passage of the cable gland body and means for fixing the spigot in the passage of the cable gland body such that the spigot is arranged to locate the sleeve, and wherein the cable gland sealing member and the spigot include correspond hooking projections, arranged to connect the sleeve to the spigot and the spigot includes a seal to prevent escape of the settable sealing material from the sleeve.

20. The cable gland of claim 15, further comprising an explosion protection seal received within the cable gland body and an armour clamp within the passage of the cable gland body, arranged to grip an earthing shield of a cable passing through the cable gland body, wherein the explosion protection seal is disposed between the armour clamp and the cable gland sealing member received within the passage of the cable gland body.

* * * * *